(12) United States Patent
Baldemair et al.

(10) Patent No.: US 12,335,934 B2
(45) Date of Patent: *Jun. 17, 2025

(54) BANDWIDTH PART SWITCHING

(71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,509

(22) Filed: Mar. 20, 2023

(65) Prior Publication Data

US 2023/0224881 A1 Jul. 13, 2023

Related U.S. Application Data

(63) Continuation of application No. 17/044,969, filed as application No. PCT/EP2019/058642 on Apr. 5, 2019, now Pat. No. 11,647,491.

(Continued)

(51) Int. Cl.
  *H04W 72/0453* (2023.01)
  *H04L 5/00* (2006.01)
  (Continued)

(52) U.S. Cl.
  CPC ........... *H04W 72/0453* (2013.01); *H04L 5/00* (2013.01); *H04L 5/0039* (2013.01);
  (Continued)

(58) Field of Classification Search
  CPC ....... H04L 5/0096; H04L 5/0039; H04L 5/00; H04L 5/0053; H04L 5/0098;
  (Continued)

(56) References Cited

U.S. PATENT DOCUMENTS 10,602,519 B2 * 3/2020 Baldemair ............... H04L 5/00
11,647,491 B2 * 5/2023 Baldemair ............... H04L 5/00
                                                        370/329

(Continued)

FOREIGN PATENT DOCUMENTS

CN       103999528 A    8/2014
RU         2117403 C1   8/1998
(Continued)

OTHER PUBLICATIONS

Chinese Office Action and English Summary dated Sep. 8, 2023 for Application 201980037674.X, consisting of 7 pages.

(Continued)

*Primary Examiner* — Peter G Solinsky
(74) *Attorney, Agent, or Firm* — Weisberg I.P. Law, P.A.

(57) ABSTRACT

Arrangement for switching between an active bandwidth part and the target bandwidth part are disclosed. A method includes selecting one or more resource blocks comprised in the target bandwidth part for a transmission or reception between the wireless device and the network node. The selected resource blocks to be used in the target bandwidth part are indicated in a resource allocation field of a downlink control channel information in the active bandwidth part. The allocation field includes information bits and the resource allocation field in the active bandwidth part and the information bits are configured based on a target bandwidth part resource allocation type. The target bandwidth part resource allocation type indicates whether the information bits have a bitmap corresponding to one or more resource block groups or an integer value corresponding to a starting resource block and a length of the allocation in resource blocks.

20 Claims, 12 Drawing Sheets

Related U.S. Application Data

(60) Provisional application No. 62/653,566, filed on Apr. 6, 2018.

(51) Int. Cl.
  *H04W 36/00* (2009.01)
  *H04W 72/23* (2023.01)
  *H04W 72/232* (2023.01)

(52) U.S. Cl.
  CPC .......... *H04L 5/0053* (2013.01); *H04L 5/0094* (2013.01); *H04L 5/0096* (2013.01); *H04W 36/00* (2013.01); *H04W 72/232* (2023.01); *H04W 72/23* (2023.01)

(58) Field of Classification Search
  CPC ............. H04W 72/0453; H04W 36/00; H04W 72/232; H04W 36/06; H04W 72/23
  See application file for complete search history.

(56) References Cited

U.S. PATENT DOCUMENTS

| | | | |
|---|---|---|---|
| 2011/0274074 | A1 | 11/2011 | Lee et al. |
| 2013/0176952 | A1* | 7/2013 | Shin .................. H04L 5/001 370/329 |
| 2014/0078973 | A1 | 3/2014 | Kazmi et al. |
| 2014/0254452 | A1 | 9/2014 | Golitschek Edler Von Elbwart et al. |
| 2017/0171752 | A1 | 6/2017 | Lee et al. |
| 2018/0049203 | A1 | 2/2018 | Xue et al. |
| 2018/0317234 | A1 | 11/2018 | Lindoff et al. |
| 2019/0103954 | A1 | 4/2019 | Lee et al. |
| 2019/0116594 | A1* | 4/2019 | Kwak .................. H04L 5/0096 |
| 2019/0124558 | A1* | 4/2019 | Ang ..................... H04W 36/06 |
| 2020/0136878 | A1* | 4/2020 | Yi ..................... H04W 72/0453 |

FOREIGN PATENT DOCUMENTS

| | | | |
|---|---|---|---|
| WO | 2013112972 | A1 | 8/2013 |
| WO | 2016028125 | A2 | 2/2016 |
| WO | 2016045094 | A1 | 3/2016 |
| WO | 2016053024 | A1 | 4/2016 |
| WO | 2017194675 | A1 | 11/2017 |
| WO | 2017196249 | A1 | 11/2017 |

OTHER PUBLICATIONS

International Search Report and written Opinion dated Jul. 23, 2019 for International Application No. PCT/EP2019/058642 filed on Apr. 5, 2019, consisting of 22-pages.
3GPP TSG RAN WG1 Meeting #92 R11801544; Title: Remaining Issues on BWP Operation; Source: VIVO; Agenda Item: 7.1.3.4.1; Document for: Discussion and Decision; Date and Location: Feb. 26-Mar. 2, 2018, Athens, Greece, consisting of 5-pages.
3GPP TSG RAN WG1 Meeting AH 1801 R11800879; Title: Remaining Issues on BWP; Source: Qualcomm Incorporated; Agenda Item: 7.3.4.1; Document for: Discussion and Decision; Date and Location: Jan. 22-26, 2018, Vancouver, Canada, consisting of 13-pages.
3GPP TSG RAN WG1 Meeting AH 1801 R11800257; Title: On PDSCH and PUSCH Resource Allocation; Source: CATT; Agenda Item: 7.3.3.1; Document for: Discussion and Decision; Date and Location: Jan. 22-26, 2018 Vancouver, Canada, consisting of 22-pages.
3gpp tsg ran WG1 Meeting #92 R11802844; Title: Remaining Issues on BWP; Source: Qualcomm Incorporated; Agenda Item: 7.1.3.4.1; Document for: Discussion and Decision; Date and Location: Feb. 26-Mar. 2, 2018, Athens, Greece, consisting of 24-pages.
International Preliminary Report on Patentability dated Apr. 22, 2020 for International Application No. PCT/ EP2019/058642 filed on Apr. 5, 2019, consisting of 13-pages.
Russian Office Action and Search Report with English Translation dated Mar. 22, 2021 for Patent Application No. 2020135524/07, consisting of 16-pages.
Korean Office Action with English Summary Translation dated Jan. 14, 2022 for Patent Application No. 10-2020-7032142, consisting of 10-pages.
3GPP TSG RAN WG1 Meeting AH 1801 R1-1800332; Title: Remaining details on DL/UL resource allocation and TBS; Agenda Item: 7.3.3.1; Source: Intel Corporation; Document for: Discussion and Decision; Date and Location: Jan. 22-26, 2018, Vancouver, Canada, consisting of 13-pages.
TSG-RAN WG1 #92 R1-1802916; Title: On remaining issues of BWPs; Agenda Item: 7.1.3.4.1; Source: Ericsson; Document for: Discussion and Decision; Date and Location: Feb. 26-Mar. 2, 2018, Athens, Greece, consisting of 3-pages.
Japanese Notice of Allowance and English machine translation dated Nov. 28, 2022 for Application No. 2020-554498, consisting of 6 pages.
3GPP TSG RAN WG1 Meeting #92 R1-1802937; Title: Remaining issue on resource allocation under cross-BWP Scheduling; Source: WILUS Inc.; Agenda item: 7.1.3.4.1; Document for: Discussion/Decision; Location and Date: Athens Greece, Feb. 26-Mar. 2, 2018, consisting of 3 pages.
TSG-RAN WG1 #92bis R1-1805199; Title: On BWP adaptation; Title: On BWP adaptation; Source: Ericsson; Agenda tem: 7.1.3.4.1; Document for: Discussion and Decision; Location and Date: Sanya, China, Apr. 16-20, 2018, consisting of 3 pages.
Japanese Office Action and English Summary dated Mar. 29, 2024 for Application No. 2022202277, consisting of 11 pages.

* cited by examiner

BANDWIDTH PART SWITCHING

CROSS-REFERENCE TO RELATED APPLICATIONS

This application is a Continuation of U.S. application Ser. No. 17/044,969 filed Oct. 2, 2020 entitled "BANDWIDTH PART SWITCHING," which is a Submission Under 35 U.S.C. § 371 for U.S. National Stage Patent Application of International Application No.: PCT/EP2019/058642, filed Apr. 5, 2019 entitled "BANDWIDTH PART SWITCHING," which claims priority to U.S. Provisional Application No. 62/653,566, filed Apr. 6, 2018, the entireties of all of which are incorporated herein by reference.

TECHNICAL FIELD

This disclosure relates to resource allocation, and in particular to switching between bandwidth parts and the allocation of resources therein.

BACKGROUND

The 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms (or less) end-to-end latency. For eMBB, the requirements on latency and error probability can be less stringent whereas the required supported peak rate and/or spectral efficiency can be higher.

In Release-15 (Rel-5) NR, a user equipment (UE) can be configured with up to four carrier bandwidth parts (BWPs) in the downlink (DL), with a single downlink carrier BWP being active at a given time. Likewise, a UE can be configured with up to four carrier BWPs in the uplink, with a single uplink carrier BWP being active at a given time. If a UE is configured with a supplementary uplink, the UE can in addition be configured with up to four carrier BWPs in the supplementary uplink with a single supplementary uplink BWP part being active at a given time.

For a carrier BWP with a given numerology $\mu_i$, a contiguous set of physical resource blocks (PRBs) are defined and numbered from 0 to $N_{BWP,i}^{size}-1$, where i is the index number of the carrier bandwidth part. A resource block (RB) is defined as 12 consecutive subcarriers in the frequency domain. In NR, each of the carrier bandwidth parts can be configured with a particular numerology, comprising the SCS (also referred to as Δf) and cyclic prefix (CP) type such as for Long Term Evolution (LTE). Table 1 below shows the four supported numerologies for NR, with $\mu_i=0$ corresponding to the LTE numerology.

TABLE 1

| Supported NR transmission numerologies. | | |
| --- | --- | --- |
| μ | $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |

Various physical channels are also defined by 3GPP standards for 5G/NR. A downlink physical channel corresponds to a set of resource elements carrying information originating from higher layers. The following NR downlink (DL) physical channels are defined:
   Physical Downlink Shared Channel, PDSCH
   Physical Broadcast Channel, PBCH
   Physical Downlink Control Channel, PDCCH:
   PDSCH is the main physical channel used for unicast downlink data transmission, but also for transmission of RAR (random access response), certain system information blocks (SIB s), and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink (UL) physical channel corresponds to a set of resource elements carrying information originating from higher layers. The following uplink physical channels are defined for NR:
   Physical Uplink Shared Channel, PUSCH:
   Physical Uplink Control Channel, PUCCH
   Physical Random Access Channel, PRACH
   PUSCH is the uplink counterpart to the PDSCH. PUCCH is used by UEs to transmit uplink control information, including HARQ acknowledgements, channel state information reports, etc. PRACH is used for random access preamble transmission.

In general, an NR UE shall determine the RB assignment in the frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR. In NR, two frequency resource allocation schemes, type 0 and type 1, are supported for PUSCH and PDSCH. The particular type to use for a PUSCH/PDSCH transmission is either defined by an RRC-configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall upon detection of PDCCH intended for the UE determine first the uplink/downlink carrier bandwidth part and then the resource allocation within the carrier bandwidth part. The UL BWP for PUSCH carrying msg3 is configured by higher layer parameters. In resource allocation of type 0, the frequency domain resource assignment information includes a bitmap indicating the Resource Block Groups (RBGs) that are allocated to the scheduled UE where a RBG is a set of consecutive physical resource blocks. The RBG size can be configured to 2, 4, 8, or 16.

On the other hand, in resource allocation type 1, the frequency domain resource assignment information consists of a resource indication value (RIV) corresponding to a starting virtual resource block ($RB_{start}$) and a length in terms of contiguously allocated resource blocks $L_{RBs}$. The resource indication value may be defined by if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size}-L_{RBs}+1) + (N_{BWP}^{size}-1-RB_{start})$ where $L_{RBs} \geq 1$ and shall not exceed $N_{BWP}^{size} - RB_{start}$; and $N_{BWP}^{size}$ is the number of RBs in the BWP corresponding BWP.

The number of bits needed for indicating all possible RIV values can be calculated by $\lceil \log_2(N_{BWP}^{size}(N_{BWP}^{size}+1)/2) \rceil$, i.e., to indicate all possible starting positions and lengths.

Signalling of frequency domain resource assignment based on RIV encoded with quantized starting virtual resource block ($RB_{start}$) and length ($L_{RBs}$) is performed in the LTE standard, e.g., type-2 resource block assignment field in DCI format 1C for very compact scheduling of one PDSCH codeword transmission; DCI format 7-1A/7-1B for subslot/slot based PDSCH transmission; and type 0 resource block assignment field in DCI format 7-0A/7-0B for subslot/slot based PUSCH transmission. For all these signalling methods, the same quantization step size is assumed for the starting RB position and the length. In addition, the minimum length is limited to the step size (i.e., cannot be one).

In NR, a carrier bandwidth part may be configured with up to 275 RBs. In this case, the frequency domain resource assignment field requires at least 18 bits (with RBG size equal to 16) if using frequency resource allocation type 0. If resource allocation type 1 is used, then, the number of frequency domain resource assignment field can be reduced to 16 bits. Furthermore, the number of bits for type 1 resource allocation may be defined based on another BWP than the one the resource allocation should be applied to. Similarly, due to other constraints, the number of signalling bits may not be sufficient for frequency domain resource assignment in the active BWP on which PDSCH/PUSCH is scheduled to be transmitted. In addition, for some special cases (e.g., msg3 transmission in a random access procedure), the requirements of the RB resolution for starting RB position and length can be different. For at least these reasons, the LTE approach for signalling frequency-domain resource assignment is inadequate, and new signalling methods for frequency domain resource assignment are needed.

A network node may signal a UE's frequency domain resource assignment for PUSCH/PDSCH transmission by using a resource indication value (RIV) corresponding to a starting virtual resource block ($RB_{start}$) and a length in terms of contiguously allocated resource blocks $L_{RBs}$. The number of bits for indicating the RIV may be mismatched with the number of RBs in the BWP in which PUSCH or PDSCH is scheduled to be transmitted. Here, mismatch is defined as the number of bits for indicating RIV is different from $\lceil \log_2(N_{BWP}^{size}(N_{BWP}^{size}+1)/2) \rceil$, where $N_{BWP}^{size}$ is the number of RBs in the BWP. A network node may signal the UE's frequency-domain resource assignment in various ways, which are described below in more detail.

In some examples (also referred to herein as "Method 1a"), the RIV is defined such that it supports all possible allocation lengths $L_{RBs}=1, 2, \ldots, N_{BWP}^{size}$), and the resolution (or granularity) for starting virtual resource block ($RB_{start}$) is $\alpha$ RBs.

RIV encoding according to the examples of Method 1a can be determined as follows:

Assuming $RB_{start}=\{0, \alpha, 2\alpha, \ldots, (\lfloor N_{BWP}^{size}/\alpha \rfloor - 1)\alpha\}$ and $L_{RBs}=\{1, 2, \ldots, N_{BWP}^{size}\}$, define:

$RB_{start}' = RB_{start}/\alpha$, $L_{RBs}' = \lfloor L_{RBs}/\alpha \rfloor + 1$, $k = (L_{RBs}-1) \bmod \alpha \to k = \{0, 1, \ldots, \alpha-1\}$)

$N'_{BWP}{}^{size} = \lfloor N_{BWP}^{size}/\alpha \rfloor$

RIV can then be determined according to:
if $(L_{RBs}'-1) \leq \lfloor N'_{BWP}{}^{size}/2 \rfloor$ then $RIV = N'_{BWP}{}^{size}(L'_{RBs}-1) + RB'_{start} + k*(N'_{BWP}{}^{size}+1)*N_{BWP}^{size}/2$ else $RIV = N'_{BWP}{}^{size}(N'_{BWP}{}^{size}-L'_{RBs}+1) + (N'_{BWP}{}^{size}-1-RB'_{start}) + k*(N'_{BWP}{}^{size}+1)*N'_{BWP}{}^{size}/2$ Also according to the exemplary examples of Method 1a, the value of $\alpha$ can be determined by equations (1) and (2) below. The number of encoded RIVs, M, is $$M = \alpha(\lfloor N_{BWP}^{size}/\alpha \rfloor + 1)*(\lfloor N_{BWP}^{size}/\alpha \rfloor)/2 \quad (1)$$

and if the number of bits for signaling RIV is b, then the following must be satisfied:

$$b = \lceil \log_2 M \rceil \quad (2)$$

Given a value of b, the resolution for starting virtual resource block ($RB_{start}$) in terms of number of RBs ($\alpha$) can be determined by using equation (1) and (2). For example, if the number of bits for frequency allocation is b=4 bits for a BWP of $N_{BWP}^{size}=6$ RBs, then, the resolution of the starting RB should be designed to $\alpha=2$ as shown in FIG. 1. In another example, if the number of bits for frequency allocation is b=3 for the same BWP of $N_{BWP}^{size}=6$ RBs, then, the resolution of the starting RB should be $\alpha=3$.

In other examples according to Method 1a, the value of $\alpha$ can be determined by $\alpha = \lceil (N_{BWP,1}^{size}/N_{BWP,2}^{size})^2 \rceil$, where $N_{BWP,1}^{size}$ is the size of the BWP to which apply the RIV, and $N_{BWP,2}^{size}$ is the size of the BWP used to define the RIV size or the maximum size of the BWP that can be supported by the number of signaling bits used for frequency allocation.

In other examples (also referred to herein as "Method 1b"), the RIV is defined such that it supports all possible starting virtual resource block ($RB_{start}=0, 1$, and the resolution for allocation lengths is $\alpha$ RBs ($L_{RBs}=1, 1+\alpha, \ldots, \lfloor (N_{BWP}^{size}-1)/\alpha \rfloor \alpha + 1$).

In other examples (also referred to herein as "Method 2a"), the RIV is determined such that it supports flexible starting virtual resource block no greater than $N_{BWP}^{size}-L_{min}$ (i.e., $RB_{start}=0, 1, 2, \ldots, N_{BWP}^{size}-L_{min}$), and the length no less than $L_{min}$ (i.e., $L_{RBs}=L_{min}, L_{min}+1, \ldots, N_{BWP}^{size}$) with $1 \leq L_{min} \leq N_{BWP}^{size}$.

RIV encoding according to the examples of Method 2a can be determined as follows. Assuming $RB_{start}=\{0, 1, 2, \ldots, N_{BWP}^{size}-L_{min}\}$ and $L_{RBs}=\{L_{min}, L_{min}+1, \ldots, N_{BWP}^{size}\}$, define:

$L'_{RBs} = L_{RBs} - L_{min} + 1$, $N'_{BWP}{}^{size} = N_{BWP}^{size} - L_{min} + 1$ RIV can then be determined according to:
if $(L_{RBs}'-1) \leq \lfloor N'_{BWP}{}^{size}/2 \rfloor$ then $RIV = N'_{BWP}{}^{size}(L'_{RBs}-1) + RB_{start}$ else $$RIV = N'_{BWP}{}^{size}(N'_{BWP}{}^{size} - L_{RBs} + 1) + (N'_{BWP}{}^{size} - 1 - RB_{start})$$

Also according to the example of Method 2a, the value of $L_{min}$ can be determined by equations (3)-(5) below. The number of encoded RIVs, M, is determined by:

$$M = (N_{BWP}{}^{size} - L_{min} + 1) * (N_{BWP}{}^{size} - L_{min} + 2)/2 \quad (3)$$

Assuming that the number of bits available for signaling RIV is b, then, the following relation must be satisfied:

$$b = \lceil \log_2 M \rceil \quad (4)$$

As such, given a value of b, the value of $L_{min}$ can be determined by using eqs. (3) and (4):

$$L_{min} = N_{BWP}^{size} + \left\lceil \frac{3 - \sqrt{1 + 2^{b+3}}}{2} \right\rceil \quad (5)$$

In other examples (also referred to herein as "Method 2b"), the RIV is determined such that it supports flexible starting virtual resource block no greater than $N_{BWP,1}{}^{size} - 1$ (i.e., $RB_{start} = 0, 1, \ldots, N_{BWP,2}{}^{size} - 1$), and the lengths is no greater than $L_{max}$ (i.e., $L_{RBs} = 1, 2, \ldots, L_{max}$) with $1 \leq L_{max} \leq \min(N_{BWP,1}{}^{size}, N_{BWP,2})$, where $N_{BWP,1}{}^{size}$ is the size of the BWP to which apply the RIV, and $N_{BWP,2}{}^{size}$ is the size of the BWP used to define the RIV size or the maximum size of the BWP that can be supported by the number of signalling bits used for frequency allocation. FIG. 9 below illustrates a manner of using 5 bits for encoding RIV, according to Method 2b, to support frequency domain resource allocation for a BWP with $N_{BWP}{}^{size} = 8$ by using $L_{max} = 6$. This case is overlaid in FIG. 9 with encoding for the case of $N_{BWP}{}^{size} = 6/L_{max} = 6$.

RIV encoding according to the examples of Method 2b can be determined as follows. Assuming $RB_{start} = \{0, 1, 2, \ldots, N_{BWP}{}^{size} - 1\}$ and $L_{RBs} = \{1, 2, \ldots, L_{max}\}$, define $N'_{BWP}{}^{size} = N_{BWP,2}{}^{size}$. RIV can then be determined according to:

if $(L_{RBs} - 1) \leq \lfloor N'_{BWP}{}^{size}/2 \rfloor$ then $$RIV = N'_{BWP}{}^{size}(N'_{BWP}{}^{size} - L_{RBs} + 1) + (N'_{BWP}{}^{size} - 1 - RB_{start})$$

else $$RIV = N'_{BWP}{}^{size}(N'_{BWP}{}^{size} - L_{RBs} + 1) + (N'_{BWP}{}^{size} - 1 - RB_{start})$$

Also, according to the examples of Method 2b, a value of $L_{max}$ can be determined by equations (6)-(8) below. The number of encoded RIVs, M, is determined by:

$$M = N'_{BWP}{}^{size}(N'_{BWP}{}^{size} + 1)/2 \quad (6)$$

Assuming that the number of bits available for signalling RIV is b, then, the following relation must be satisfied:

$$b = \lceil \log_2 M \rceil \quad (7)$$

As such, given a value of b, the value of $L_{min}$ can be determined by using eqs. (6) and (7):

$$L_{max} = \left\lfloor \frac{\sqrt{1 + 2^{b+3}} - 1}{2} \right\rfloor \quad (8)$$

In other examples (also referred to herein as "Method 3"), the RIV is determined according to resource allocation type 1 in LTE, but different puncturing patterns are configured to exclude a set of combinations of $RB_{start}$ and $L_{RBs}$. Various examples pertaining to Method 3 are given below, but these are intended only to aid in explanation and understanding of the principles related to Method 3 and are not intended to be limiting.

In one example, a puncturing pattern configuration field for indicating the positions of the truncating/padding bits when applying standard RIV encoding can be included in the signalling for frequency-domain resource allocation. For example, the currently-defined maximum number of 275 PRBs, for NR, requires 16 bits to represent a RIV value using the legacy/existing type 1 encoding for assignment of frequency-domain resources, illustrated in FIG. 3 above. If 12 bits are used instead for frequency domain resource assignment in a BWP configured with 275 RBs, then four of the 16 bits can be punctured in various arrangements.

In one such example puncturing arrangement, the two most significant bits of the 12 bits can be used for puncturing pattern indication. For example, these bits can indicate various patterns such as inserting x=4 (e.g., x=16-12) most significant bits with value set to '0' after y bits, and interpret the expanded resource block assignment according to standard SIV method. The value of y can depend on the value of the two pattern indication bits. For example, y=2, 4, 8, 12 can correspond to patterns 1, 2, 3, and 4, respectively, indicated by the two most significant bits.

pattern 1, 0000 00XX XXXX XXXX
pattern 2, 01XX 0000 XXXX XXXX
pattern 3, 10XX XXXX 0000 XXXX
pattern 4, 11XX XXXX XXXX 0000

In another example, the puncturing can be a predefined pattern, e.g. the x=4 MSB with value set to zeros are always inserted after y=12 bits; In this case, the predefined pattern is XXXX XXXX XXXX 0000. In another example, the $N_{hop}$ most significant bits of the 12 frequency allocation bits can be used for frequency hopping indication. The puncturing pattern indication bits can be indicated by the 2 bits after the $N_{hop}$ frequency hopping bits. Padding bits are inserted after y bits, where the value of y is based on both the hopping bits and the puncturing pattern indication bits. If the puncturing pattern is predefined or configured by higher layers, then no bits are needed (in DCI) to indicate puncturing pattern, and the value of y can depend on the predefined puncturing pattern and the number of bits for frequency hopping indication.

In other examples corresponding to Method 3, the pattern indication can depend on other known parameters, e.g. the range of bandwidth part size. Likewise, the pattern indication bits can be provided to the UE in various ways including, for example: broadcast system information messages (e.g., SIB1); UE-specific Radio Resource Control (RRC) messages that can overwrite existing indication that were predefined or provided in SIB messages; in other reserved fields or code points in the scheduling DCI or RAR message.

In other examples (also referred to herein as "Method 4"), the RIV is determined according to a starting virtual resource block ($RB_{start}$) (e.g., similar to Method 1a) or according to allocation length $L_{RBs}$ (e.g., similar to Method 1b). However, exemplary embodiments according to Method 4 differ from exemplary embodiments according to Methods 1a/1b in that the RIV is encoded by using the existing standard RIV encoding based on the BWP which defines the RIV size.

More generally, in Method 4, a frequency domain resource assignment field can be encoded to a RIV corresponding to: 1) a starting virtual resource block ($RB_{start}$)

with a resolution of $K_S$ RBs; and 2) a length ($L_{RBs}$) of virtually contiguously allocated resource blocks with a resolution of $K_L$ RBs. The RIV can be encoded based on existing standard RIV encoding according to a BWP that defines the frequency domain resource assignment field size. In the following explanatory but non-limiting examples, the frequency-domain resource assignment field is assumed to have a size of b bits and to be applied for a first BWP with $N_{BWP,1}^{size}$ RBs. The size, b, corresponds to a second BWP with $N_{BWP,2}^{size}$ RBs, i.e., $b=\lceil \log_2(N_{BWP,2}^{size}(N_{BWP,2}^{size}+1)/2) \rceil$.

In one group of examples of Method 4, the quantized values of $RB_{start}$ start from 0 and the quantized values of $L_{RBs}$ start from $K_L$. In other words, RIV encoding is such that an encoded RIV corresponds to a starting virtual resource block $RB_{start}=(0, K_S, 2K_S, \ldots, RB_{start,max})$ and $L_{RBs}=(K_L, 2K_L, L \ldots, L_{RBs,max})$, with $$RB_{start,max}=\min((N_{BWP,2}^{size}-1) \times K_S, (\lfloor N_{BWP,1}^{size}/K_S \rfloor - 1) \times K_S), \text{ and}$$

$$L_{RBs,max}=\min(N_{BWP,2}^{size} \times K_L, \lfloor N_{BWP,1}^{size}/K_L \rfloor \times K_L).$$

An example where four (4) bits are allocated for signaling of frequency domain resource assignment in an initial BWP configured with five (5) RBs. The RIV can be encoded according to the initial BWP based on the standard encoding method. To use four bits for frequency domain resource assignment in another BWP configured with six (6) RBs, a resolution of two (2) RBs can be introduced to the starting virtual resource block.

RIV encoding according to the above-described examples of Method 4 can be determined as follows. Assuming $RB'_{start}=RB_{start}/K_S$ and $L'_{RBs}=L_{RBs}/K_L$. RIV can then be determined according to:

If $1 \leq L'_{RBs} \leq N'_{BWP}{}^{size}-RB'_{start}$, then
  if $(L'_{RBs}-1)<=\lfloor N'_{BWP}{}^{size}/2 \rfloor$ then $RIV=N'_{BWP}{}^{size}(L'_{RBs}-1)+RB'_{start}$ else $RIV=N'_{BWP}{}^{size}(N'_{BWP}{}^{size}-L'_{RBs}+1)+(N'_{BWP}{}^{size}-1-RB'_{start})$ else
    RIV=Invalid
end Furthermore, $K_S$ and $K_L$ can then be determined (for all integer values$\geq 1$) in various ways for this group of examples of Method 4, based on the following definitions:

$$RB_{start,max}=\min((N_{BWP,2}^{size}-1) \times K_S, (\lfloor N_{BWP,1}^{size}/K_S \rfloor - 1) \times K_S)$$

$$L_{RBs,max}=\min(N_{BWP,2}^{size} \times K_L, \lfloor N_{BWP,1}^{size}/K_L \rfloor \times K_L)$$

Nevertheless, when $N_{BWP,2}^{size}<\lfloor N_{BWP,1}^{size}/K_S \rfloor$ or/and $N_{BWP,2}^{size}<\lfloor N_{BWP,1}^{size}/K_L \rfloor$, some possible quantized values of $RB_{start}$ and $L_{RBs}$ may not be supported. Moreover, it is possible to optimize the values of $K_S$ and $K_L$ to make efficient use of the b signaling bits, and at the same time provide the required flexibility frequency domain resource assignment.

In some examples corresponding to Method 4, the value(s) of $K_S$ and/or $K_L$ can be determined based on the ratio between $N_{BWP,1}^{size}$ and $N_{BWP,2}^{size}$. For example, if $K_S=K_L=K$, then, $K=f(N_{BWP,1}^{size}/N_{BWP,2}^{size})^2)$, where the function $f(\cdot)$ can be floor, ceiling, round to the closest integer, or any other function that can be employed to provide an appropriate and/or desirable result.

In other examples corresponding to Method 4, if $K_L=1$ is required (e.g., for PUSCH or PDSCH transmissions with small payload sizes), then the value of $K_S$ can be determined based on $f((N_{BWP,1}^{size}/N_{BWP,2}^{size})^2)$, where the function $f(\cdot)$ can be floor, ceiling, round to the closest integer, or any other function that can be employed to provide an appropriate and/or desirable result. Similarly, if $K_S=1$, then, the value of $K_L$ is determined based on $f((N_{BWP,1}^{size}/N_{BWP,2}^{size})^2)$.

In other examples corresponding to Method 4, $K_L=K_S=K$, and the value of K can be determined as follows. If all quantized allocation possibilities are supported then, the number of encoded RIVs, M, is determined by:

$$M=(\lfloor N_{BWP,1}^{size}/K \rfloor+1)*(\lfloor N_{BWP,1}^{size}/K \rfloor)/2 \tag{9}$$

Assuming that the number of bits available for signalling RIV is b, then, the following relation must be satisfied:

$$b=\lceil \log_2 M \rceil \tag{10}$$

As such, given a value of b, the resolution for starting virtual resource block and the length in terms of number of RBs, K, can be derived by using equation (9) and (10). Although In the above it has been assumed the down sampling starts $RB_{start}=0$ and $L_{RBs}=K_L$, different offset values can be used, leading to slightly different values/equations.

In other examples corresponding to Method 4, $K_L=K_S=1$ if the ratio between $N_{BWP,1}^{size}$ and $N_{BWP,2}^{size}$ is below a certain threshold. For example, if:

$$\lceil \log_2(N_{BWP,1}^{size}(N_{BWP,1}^{size}+1)/2) \rceil - \lceil \log_2(N_{BWP,2}^{size}(N_{BWP,2}^{size}+1)/2) \rceil < 1,$$

then, $K_S=K_L=1$. For lager BWP, this can be approximated to:
  if $N_{BWP,1}^{size}/N_{BWP,2}^{size}<\sqrt{1/2}$, then $K_S=K_L=1$.

In other examples corresponding to Method 4, $K_L=K_S=1$ if the difference between $N_{BWP,1}^{size}$ and $N_{BWP,2}^{size}$ is below a certain threshold.

In another group of examples of Method 4, the quantized values of $RB_{start}$ start from 0 and the quantized values of $L_{RBs}$ start from $L_{RBs}^{offset}$. In other words, the RIV encoding is such that an encoded RIV corresponds to a starting virtual resource block $RB_{start}=(0, K_S, 2K_S, \ldots, RB_{start,max})$ with $L_{RBs}=(L_{RBs}^{offset}, K_L+L_{RBs}^{offset}, 2K_L+L_{RBs}^{offset}, \ldots, L_{RB,max})$, with $1 \leq L_{RBs}^{offset} < K_L$, and the maximum values represented as:

$$RB_{start,max}=\min((N_{BWP,2}^{size}-1) \times K_S, (\lfloor N_{BWP,1}^{size}/K_S \rfloor - 1) \times K_S)$$

$$L_{RBs,max}=\min(N_{BWP,2}^{size} \times K_L, (\lfloor N_{BWP,1}^{size}-L_{RBs}^{offset} \rfloor / K_L) \times K_L + L_{RBs}^{offset})$$

RIV encoding according to the above-described examples of Method 4 can be determined as follows. Assuming $$N_{BWP}^{'size}=N_{BWP,2}^{size}, RB'_{start}=\frac{RB_{start}}{K_S}, \text{ and}$$

$$L'_{RBs}=(L_{RBs}-L_{RBs}^{offset})/K_L+1,$$

RIV can then be determined according to:
If $1 \leq L'_{RBs} \leq N'_{BWP}{}^{size}-RB'_{start}$, then
  if $(L'_{RBs}-1)<=\lfloor N'_{BWP}{}^{size}/2 \rfloor$ then $RIV=N'_{BWP}{}^{size}(L'_{RBs}-1)+RB'_{start}$ else $RIV=N'_{BWP}{}^{size}(N'_{BWP}{}^{size}-L'_{RBs}+1)+(N'_{BWP}{}^{size}-1-RB'_{start})$ Else
  RIV=Invalid
end Furthermore, $K_S$ and $K_L$ can then be determined (for all integer values≥1) in various ways for this group of examples of Method 4, based on the following definitions:

$$RB_{start,max} = \min((N_{BWP,2}^{size}-1) \times K_S, (\lfloor N_{BWP,1}^{size}/K_S \rfloor - 1) \times K_S)$$

$$L_{RBs,max} = \min(N_{BWP,2}^{size} \times K_L, \lfloor (N_{BWP,1}^{size} - L_{RBs}^{offset})/K_L \rfloor \times K_L + L_{RBs}^{offset})$$

Nevertheless, when $N_{BWP,2}^{size} < \lfloor N_{BWP,1}^{size}/K_S \rfloor$ or/and $N_{BWP,2}^{size} < \lfloor N_{BWP,1}^{size}/K_L \rfloor$, some possible quantized values of $RB_{start}$ and $L_{RBs}$ may not be supported.

For example, in one example corresponding to Method 4, $K_L = K_S = K$, and the value of K can be determined as follows. If all quantized allocation possibilities are supported then, the number of encoded RIVs (M) is determined by:

$$M = (N'+1)*(N')/2 \quad (11)$$

where $N' = \max (\lfloor N_{BWP,1}^{size}/K \rfloor, \lfloor (N_{BWP,1}^{size} - L_{RBs}^{offset})/K \rfloor + 1)$. Assuming that the number of bits available for signaling RIV is b, then the following relation must be satisfied:

$$b = \lceil \log_2 M \rceil \quad (12)$$

As such, given a value of b, the resolution for starting virtual resource block and the length in terms of number of RBs, K, can be derived by using equations (11) and (12). For this group of embodiments of Method 4, $K_S$ and $K_L$ can also be determined in other ways to make efficient use of the b signaling bits and at the same time provide the required flexibility frequency domain resource assignment, including those discussed above in relation to the other group of embodiments of Method 4.

Furthermore, $K_S$ and $K_L$ can also be determined, according to this group of embodiments, in various ways based on the time-domain assignment of resources to the UE. In one example, $K_L = K_S = K$ and the value of K can be determined by $K = \lceil \alpha N_{BWP,1}^{size}/N_{BWP,2}^{size} \rceil$, where $N_{BWP,1}^{size}$ is the size of the BWP where the frequency allocation applies; $N_{BWP,2}^{size}$ is the size of the BWP used to define the RIV size or the maximum size of the BWP that can be supported by the number of signaling bits used for frequency allocation assuming one slot time resource allocation (i.e., 14 OFDM symbols);

$$\alpha = f\left(\frac{14}{T}\right),$$

where T is the time resource allocation in terms of number of OFDM symbols; and the function $f(\cdot)$ can be floor, ceiling, round to the closest integer, or any other function that can be employed to provide an appropriate and/or desirable result.

In another example, $K_L = 1$ and the value of $K_S$ can be determined according to the same or substantially similar methods for determining the value of α discussed above in relation to Method 1a, e.g., $K_S = \lceil (\alpha N_{BWP,1}^{size}/N_{BWP,2}^{size})^2 \rceil$. In another example, $K_S = 1$ and the value of $K_L$ can be determined according to the same or substantially similar methods for determining the value of α discussed above in relation to Method 1a, e.g., $K_L = \lceil (\alpha N_{BWP,1}^{size}/N_{BWP,2}^{size})^2 \rceil$. In another example, if $\alpha N_{BWP,1}^{size} - N_{BWP,2}^{size}$ is smaller than a threshold, then $K_L = K_S = 1$.

The above examples of encoding frequency-domain resource allocations for NR are given for purposes of explanation and without limitation. Other approaches and/or variations consistent with the above description can easily be envisioned by a person of ordinary skill in the art. For example, a skilled person would readily comprehend that one of more combinations of the above encoding techniques could be employed. Likewise, a skilled person would also readily comprehend that various additive and/or multiplicative scaling factors could be used in the above encoding methods. For example, scaling factor(s) could be applied to the starting virtual resource block and/or the allocation length prior to performing an encoding according to one (or a combination) of the techniques discussed above. Furthermore, although embodiments have been described above in terms of a first BWP and a second BWP, and how to define RIV encoding for the second BWP using RIV size of a first BWP, such embodiments can be applied to solve more general problems related to encoding of a RIV for a second BWP using a first RIV size value, where the first RIV size value is not a "natural" RIV size of the second BWP.

By more efficient use of the bits available for signalling resource assignments, these and other exemplary embodiments can improve the usage efficiency of physical downlink control channels (PDCCH) in NR, resulting in improvements to the latency of shared resource assignment and in the number of UEs that can utilize a particular PDCCH resource. Such improvements can be manifested as improved end-user performance and/or quality of user experience. Other exemplary benefits include reduced hardware requirements (e.g., fewer processors and memories), which can reduce network deployment cost and reduce environmental impact caused by manufacture, shipping, installation, etc. of hardware components.

SUMMARY

Higher efficiency can be achieved by configuring the information bits of a resource allocation in an active bandwidth part, when switching between bandwidth parts, based on the target bandwidth part resource allocation type. This enables simpler coding schemes to be defined and interpreted by a wireless device.

Simplifying the configuration and enabling a wireless device to interpret the resource allocation in a DCI based on predefined rules and/or the target bandwidth part resource allocation type avoids unnecessary signaling which should in particular be avoided when the wireless device is operating in a narrowband, bandwidth part. For example power savings are achieved.

In one aspect a method performed by a network node for switching between an active bandwidth part, BWP, and a target BWP is provided. Each of the respective BWPs comprises one or more resource blocks for use by the wireless device. The method comprises selecting one or more resource blocks comprised in the target BWP for a transmission or reception between the wireless device and the network node. The method further comprises determining a target resource allocation type in dependence of a relationship between the one or more resource blocks for the target BWP and one or more resource blocks of the active BWP. The resource allocation field in the active BWP and the information bits therein are configured based on the target BWP resource allocation type wherein the target BWP resource allocation type indicates whether the information bits comprise a bitmap corresponding to one or more resource block groups or an integer value corresponding to a starting position and a length of the allocation. The method further comprises indicating the selected one or more resource blocks to be used in the target BWP in a resource allocation field of a downlink control channel information in the active BWP, the allocation field comprising information bits configured according to the target resource allocation type.

In another aspect, a method performed by a wireless device for switching between an active bandwidth part, BWP, and a target BWP is provided. Each of the respective BWPs comprise one or more resource blocks for use by the wireless device. The method comprises receiving a resource allocation field in a downlink control information in the active BWP, the resource allocation field comprising information bits for allocating the one or more resource blocks in the target BWP. A resource allocation type indicates whether the information bits comprise a bitmap corresponding to one or more resource block groups or an integer value corresponding to a starting position and a length of the allocation. The method further comprises interpreting the resource allocation information bits based on a target BWP resource allocation type wherein the target bandwidth resource allocation type is determined in dependence of a relationship between the one or more resource blocks for the target BWP and one or more resource blocks of the active BWP. The method further comprises switching to the target BWP for a transmission or reception on the allocated target BWP resource blocks.

In another aspect a network node for switching between an active bandwidth part, BWP, and a target BWP is provided. Each of the respective BWPs comprises one or more resource blocks for use by the wireless device. The network node is configured to select one or more resource blocks comprised in the target BWP for a transmission or reception between the wireless device and the network node. The network node is further configured to determine a target resource allocation type in dependence of a relationship between the one or more resource blocks for the target BWP and one or more resource blocks of the active BWP. The resource allocation field in the active BWP and the information bits therein are configured based on the target BWP resource allocation type wherein the target BWP resource allocation type indicates whether the information bits comprise a bitmap corresponding to one or more resource block groups or an integer value corresponding to a starting position and a length of the allocation. The network node is further configured to indicate the selected one or more resource blocks to be used in the target BWP in a resource allocation field of a downlink control channel information in the active BWP, the allocation field comprising information bits configured according to the target resource allocation type.

In another aspect, a wireless device for switching between an active bandwidth part, BWP, and a target BWP is provided. Each of the respective BWPs comprise one or more resource blocks for use by the wireless device. The wireless device configured to receive a resource allocation field in a downlink control information in the active BWP, the resource allocation field comprising information bits for allocating the one or more resource blocks in the target BWP, wherein a resource allocation type indicates whether the information bits comprise a bitmap corresponding to one or more resource block groups or an integer value corresponding to a starting position and a length of the allocation. The wireless device is further configured to interpret the resource allocation information bits based on a target BWP resource allocation type wherein the target bandwidth resource allocation type is determined in dependence of a relationship between the one or more resource blocks for the target BWP and one or more resource blocks of the active BWP. The wireless device is further configured to switch to the target BWP for a transmission or reception on the allocated target BWP resource blocks.

In another aspect, a computer program is provided, which comprises instructions which when executed on a processor cause the processor to perform any one of the methods performed by the wireless device or the network node.

In another aspect a device readable storage medium or carrier comprising a computer program is provided, wherein the computer program comprises instructions which when executed on a processor cause the processor to perform any one of the methods performed by the wireless device or the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
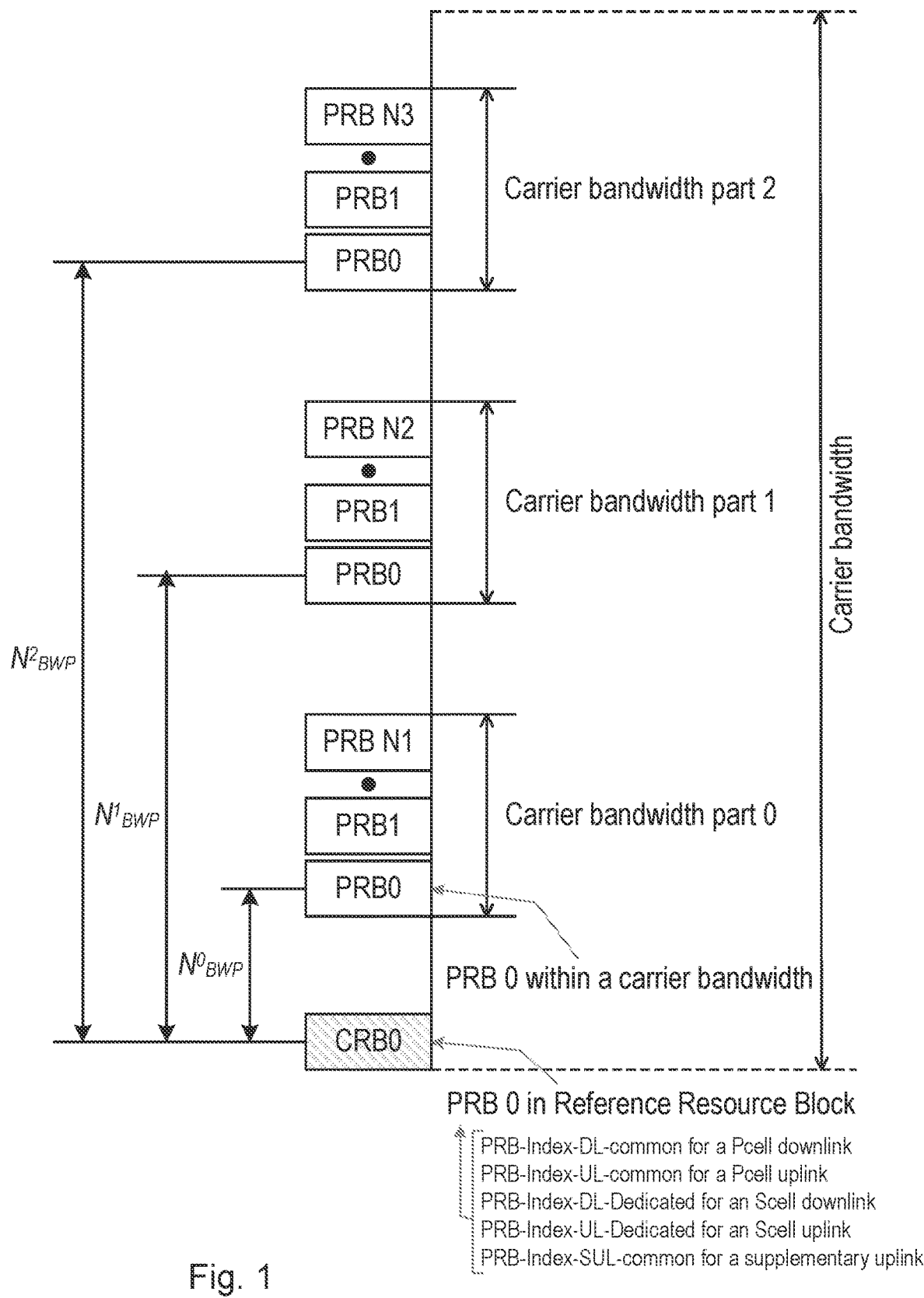
FIG. 1 depicts exemplary carrier bandwidth part (BWP) configurations for NR.

Before describing in detail exemplary embodiments, it is noted that the embodiments reside primarily in combinations of apparatus components and processing steps related to switching between an active bandwidth part and the target bandwidth part and the allocation of resources for use in the target bandwidth part. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BS s) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BS s, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As described above, NR supports bandwidth parts (BWPs). A bandwidth part is characterized by a numerology (subcarrier spacing and cyclic prefix) and a set of consecutive resource blocks (RBs) in the numerology of the BWP, starting at a certain frequency position within the carrier. A UE can be configured (e.g. using radio resource control, RRC) with multiple bandwidth parts, with one of them being the active bandwidth part. All transmission/reception of data is done using the currently active bandwidth part. BWPs can be of different size, e.g. one BWP could be "narrow" and another BWP "wide". This can be used to realize BWP adaptation with the UE typically using the narrow BWP for reception/transmission and switching to the wide BWP only when needed, thereby reducing the overall power consumption compared to constantly using the wide BWP.

As part of the DCI, it is possible to include a bandwidth part indicator. This means that the UE should switch to the bandwidth part indicated in the DCI (unless this BWP is already the active one) and receive/transmit in that BWP.

Downlink control information (DCI) in NR is used to schedule data in uplink (UL) and downlink (DL). One part of the DCI is indication of frequency-domain resources. Two resource allocation types are specified:

type 0, where the bits in the resource allocation (sub)field is interpreted as a bitmap. In some examples the bitmap indicates which resource block groups that are scheduled.

Type 1, where the bit in the resource allocation (sub)field is interpreted as an integer known as resource indication value or RIV. In some examples the RIV is a joint encoding of the starting RB number and the length of the allocation in RBs.

In NR, the UE may be configured (with radio resource control, RRC) to use one of type 0, type 1, or dynamically indicated (type 0/type 1) resource allocation. In the last case (dynamic signaling), the resource allocation information is split into two subfields; a type subfield (indicating type 0 or type 1), and a resource allocation subfield interpreted to one of type 0 or type 1 depending on the resource allocation type value.

Figure 2:
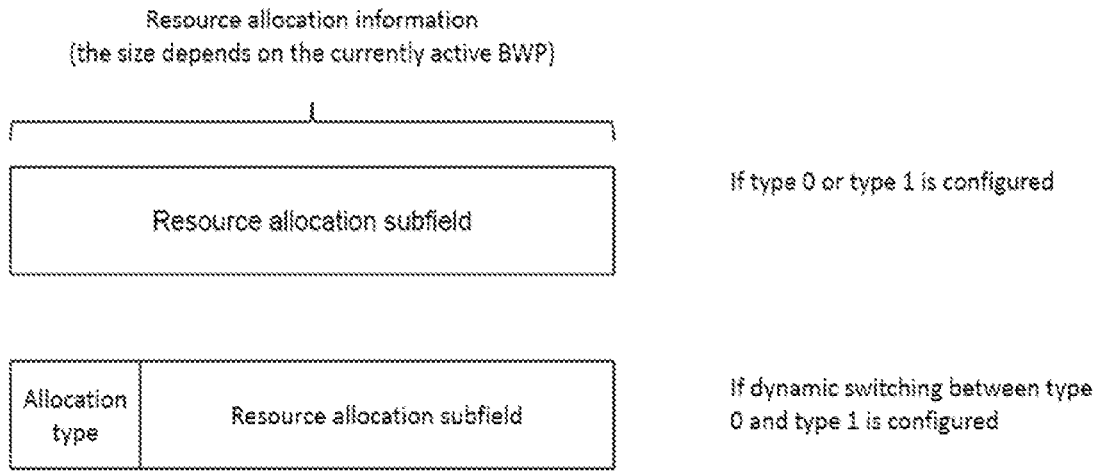
FIG. 2 is a diagram of a resource allocation field/subfield.

In FIG. 2 examples of the resource allocation field (or subfield of the DCI) are shown for a preconfigured resource allocation type and a dynamically signaled resource allocation type.

The DCI size depends on the currently active BWP. For example, a narrow BWP require less bits than a wide BWP to indicate the RBs to receive/transmit upon.

Receiving a DCI message in one BWP (the active BWP) but applying it to another BWP (the target BWP) as indicated by the BWP indicator requires the UE to "transform" the DCI received in the current BWP such that is can be applied to the typically differently-sized target BWP which may require a different number of bits in the DCI message. One possibility is to pad/truncate each field in the DCI such that it matches the need of the target BWP.

Figure 3:
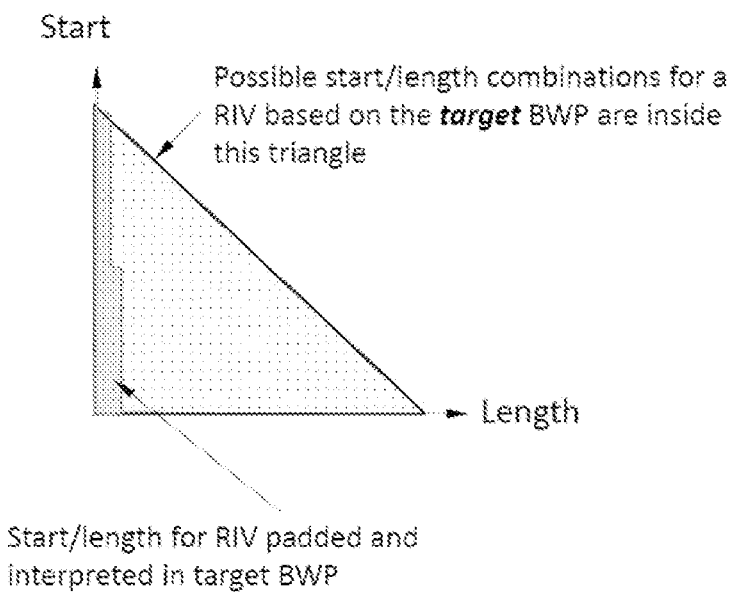
FIG. 3 depicts an exemplary resource allocation indication.

The truncation/padding of the DCI, followed by application to the target BWP can lead to severe scheduling restrictions when combined with type 1 resource allocation as illustrated in FIG. 3. The area bounded by the triangle represents the possible start position/length of the resource allocation whereas the shaded area represents and example of the reduced scheduling capability if the resource allocation field is interpreted based on the active bandwidth resource allocation type. If the resource allocation information bits are configured to represent a bitmap, typically identifying resource block groups, a certain granularity of physical resource blocks may be allocated. If the number of bits available in the DCI is reduced then the granularity could be reduced to address the same number of resources, otherwise less resources can be indicated.

Given the number or possible combinations of active BWP resource allocation information configurations combined with the possible target BWP resource allocation information configurations a simplified approach is desired.

In order to provide a simplified means for allocating resources when switching between an active bandwidth part and a target bandwidth part the resource allocation field is interpreted differently depending on the resource allocation type configured for the target BWP. For some combinations, the resource allocation type subfield can be used to extend the resource allocation subfield.

A proposed handling of the resource allocation field is as follows. If the target BWP is configured for type 0 (and regardless of the configuration of the active BWP), interpret the resource allocation information (including the bit for the type sub header if present) as type 0 resource allocation (bitmap). Truncate/pad the resource allocation information to match the need of the target BWP. Apply the truncated/padded information to the target BWP.

If the target BWP is configured for type 1 (and regardless of the configuration of the active BWP) interpret the resource allocation information (including the bit for the type sub header if present) as a RIV value specified for the currently active BWP (i.e. a type 1 resource allocation) to obtain the start and length of the allocation. Apply the start and length (possibly after scaling, see above) to the target BWP.

If the target BWP is configured for dynamic switching between type 0 and type 1 (and regardless of the configuration of the active BWP), three options are considered:

a. always use type 0 in case of cross-BWP, interpret the resource allocation information (including the bit for the type sub header if present) as type 0 resource allocation (bitmap). Truncate/pad the resource allocation information to match the need of the target BWP. Apply the truncated/padded information to the target BWP b. always use type 1 in case of cross-BWP, interpret the resource allocation information (including the bit for the type sub header if present) as a RIV value specified for the currently active BWP (i.e. a type 1 resource allocation) to obtain the start and length of the allocation. Apply the start and length (possibly after scaling, see above) to the target BWP.

c. allow for dynamic switching of resource allocation type. Define one bit (e.g. MSB) of the resource allocation information (prior to any padding/truncation) is interpreted as the resource allocation type subheader. If type 0 (bitmap) is indicated: truncate/pad the resource allocation subfield (i.e. the bits excluding the subfield for resource allocation type) to match the need of the target BWP. Apply the truncated/padded information to the target BWP. If type 1 (RIV) is indicated: Interpret the resource allocation subfield (i.e. the bits excluding the subfield for resource allocation type) as a RIV value specified for the currently active BWP to obtain the start and length of the allocation. Apply the start and length (possibly after scaling, see above) to the target BWP.

A wireless device or UE may be configured by a network node, e.g. a gNB, with multiple bandwidth parts, wherein each of the bandwidth parts comprises one or more resource blocks for use by the wireless device, for example for transmissions or receptions of data and/or control signaling. A bandwidth part being a frequency band allocation. Each bandwidth part may have a different frequency range, for example a narrowband BWP may be 5 Mhz and a wideband BWP may be 20 Mhz. The network node, as part of its resource scheduling may determine that the active BWP is insufficient for the scheduled communication and thereby determine that a switch to another BWP is required. Alternatively, a communication previously requiring a greater bandwidth has completed and the network node determines that the wireless device can be switched to a narrower bandwidth BWP. For the scheduled communication the network node selects one or more resource blocks comprised in the target bandwidth part for a transmission or reception between the wireless device and the network node. The network node indicates the selected resource blocks to be used in the target bandwidth part to the wireless device in a resource allocation field of a downlink control channel information (DCI) in the active bandwidth part. The allocation field comprises information bits and the resource allocation field in the active bandwidth part and the information bits therein are configured based on a target bandwidth part resource allocation type. The target bandwidth part resource allocation type indicates whether the information bits comprise a bitmap corresponding to one or more resource block groups or an integer value corresponding to a starting position and a length of the allocation. As described above, the resource allocation type may be preconfigured to a type 0 or a type 1, or the wireless device may be preconfigured to be dynamically switched between resource allocation types. When configured to switch between resource allocation types the network node may indicate the resource allocation type to the wireless device or UE in an additional field or subfield of a resource allocation field in a DCI. Each BWP has a separate configuration. In other words, a wireless device may have different resource allocation types preconfigured for each BWP.

In one aspect the network node, e.g. gNB, configures the target resource allocation information bits as an integer value corresponding to a starting position and a length of the allocation, corresponding to the selected resource blocks, when the target bandwidth part resource allocation type is preconfigured for the information bits to represent an integer value corresponding to a starting position and a length of the resource allocation. The starting position may be a physical resource block, virtual resource block or resource block group (RBG). The length of the resource allocation may be in resource blocks granularity. In other examples the length may be in resource block group granularity.

In another aspect the network node configures the target resource allocation information bits as a bitmap corresponding to the selected resource blocks when the target bandwidth part resource allocation type is preconfigured for the information bits to represent a bitmap. The bitmap may indicate positions of physical resource blocks, virtual resource blocks or resource block groups.

The granularity of the bitmap indication, i.e. the number of resource blocks or resource block groups indicated per bit may be adapted when indicating the resource allocation for a target BWP in a DCI in an active BWP for switching between BWPs. For example, as a result of too few bits to indicate all of the available resource blocks/RBGs at the desired granularity, the granularity may be reduced as a result of the adaptation.

In the above aspects, for example, the network node configures the resource allocation information bits based on what the target resource allocation type has been preconfigured to; if the target BWP has been preconfigured to a bitmap then the resource allocation information bits in the active BWP DCI for switching between DCIs is configured as a bitmap and if the target BWP has been preconfigured as an integer then the active BWP DCI for switching between DCIs is configured as an integer. The BWP switching may occur between an active BWP configured with any of the above described resource allocation types and may be switched to a target BWP which is likewise configured with any of the above described resource allocation types.

In one aspect the network node configures the target resource allocation information bits as a bitmap corresponding to the selected resource blocks when the wireless device is preconfigured for dynamic switching between resource allocation types for the target bandwidth part and the target bandwidth part resource allocation type is indicated by a resource allocation type subfield of the resource allocation field in a downlink control information in the target bandwidth part. In this aspect the switching is simplified by avoiding configuring the resource allocation type dynamically during the switching. This also has the advantage of providing an additional subfield, e.g. 1 bit, used for allocation in the target BWP which can be used for improving the resource allocation indication when too few bits are available in the DCI in the active BWP to sufficiently identify the scheduled resources in the target BWP during the switching. Again, as described above the bitmap may indicate positions of physical resource blocks or resource block groups. The granularity of the bitmap indication, i.e. the number of resource blocks or resource block groups indicated per bit may be adapted when indicating the resource allocation for a target BWP in a DCI in an active BWP for switching between BWPs. For example, as a result of too few bits to indicate all of the available resource blocks/RBGs at the desired granularity, the granularity may be reduced as a result of the adaptation.

In some aspects the network node configures the target resource allocation information bits as an integer value corresponding to a starting position and a length of the allocation, corresponding to the selected resource blocks, when the wireless device is preconfigured for dynamic switching between resource allocation types for the target bandwidth part and the target bandwidth part resource allocation type is indicated by a resource allocation type subfield of the resource allocation field in a downlink control information in the target bandwidth part. In this aspect the switching is simplified by avoiding configuring the resource allocation type dynamically during the switching. This also has the advantage of providing an additional subfield, e.g. 1 bit, used for allocation in the target BWP which can be used for improving the resource allocation indication when too few bits are available in the DCI in the active BWP to sufficiently identify the scheduled resources in the target BWP during the switching. Again, as described above, the starting position may be a physical resource block, virtual resource block or resource block group (RBG). The length of the resource allocation may be in resource blocks granularity. In other examples the length may be in resource block group granularity.

In the above aspects, when the target BWP is configured for dynamic resource allocation the resource allocation may be simplified during a BWP switching procedure by using a fixed resource allocation type. The "preconfigured" allocation type used during the BWP switching, i.e. in the DCI in the active BWP, may be preconfigured to one of type 0 or type 1, for example it could be set via radio resource control procedures. In some examples the resource allocation type for the switching procedure may be fixed in a standard specification document. In some examples one type may be preconfigured for switching from a narrowband BWP to a wideband BWP and another type preconfigured for switching from a wideband BWP to a narrowband BWP. If a bitmap (type 0) is selected for the "preconfigured" resource allocation type in the BWP switching the granularity may be reduced but the whole bandwidth may be addressed whereas if an integer (type 1) is selected then potentially a part of the available resources cannot be indicated.

In some aspects network node configures the target resource allocation information bits to comprise 1 bit for indicating a resource allocation type and configures the remaining bits as a bitmap or as an integer value corresponding to a starting position and a length of the allocation, corresponding to the selected resource blocks, when the wireless device is preconfigured for dynamic switching between resource allocation types for the target bandwidth part and the target bandwidth part resource allocation type is indicated by a resource allocation type subfield of a resource allocation field in a downlink control information in the target bandwidth part. In this aspect the network node is maintaining the dynamic resource allocation type setting however the configuration of the information bits for indicating a resource allocation for use in a target BWP may be different when the resource allocation occurs in a DCI in an active BWP during a BWP switching procedure. For example, as described above if a bitmap is selected then the encoding may provide a lower granularity due to too few bits being available in the DCI of the active BWP. This aspect provides the advantage of being able to dynamically select the resource allocation type during BWP switching but also has the disadvantage of requiring an extra subfield, e.g. 1 bit which could otherwise be used for the resource allocation information bits (bitmap or integer) field.

In any of the above aspects the bits of the resource allocation field may be truncated, or the bits may be padded out, e.g. extra bits applied to the bits of the resource allocation field.

For example, when the target bandwidth part is used to allocate a greater number of resource blocks than allocated for the active bandwidth part and the number of information bits in the resource allocation field of the downlink control information in the active bandwidth part is less than a number of information bits in a resource allocation field in the target bandwidth part the bits of the resource allocation field the network node applies additional bits which are predefined. The wireless device thus pads the resource allocation bits or appends the resource allocation bits with additional predefined bits.

In another example, when the target bandwidth part is used to allocate a smaller number of resource blocks than allocated for the active bandwidth part and the number of information bits in the resource allocation field of the downlink control information in the active bandwidth part is greater than a number of information bits in a resource allocation field in the target bandwidth part the remaining bits of the resource allocation field are truncated. For example, the unused bits may be set to predefined values or may not be sent in the DCI.

As described above, in any of the previously described aspects or embodiments, the resource allocation field of the downlink control information in the active bandwidth part may comprises a bandwidth part indicator, for instructing the wireless device to switch to the target bandwidth part. The BWP indicator may be defined for indicating the BWP to which the DCI applies. Thus if the DCI is received and the BWP indicator identifies a different BWP the wireless device indirectly detects this as an indication to switch BWPs.

In any of the above described aspects or embodiments, the information bits are configured independently of a resource allocation type associated with the active bandwidth part. This simplifies the configuration and interpretation but means that the wireless device must first determine that the BWP is to be changed and then interpret the resource allocation bits of the active BWP DCI based on the configuration the wireless device has for the target BWP.

In the aspects describing an integer value corresponding to a starting position and a length of the resource allocation, corresponding to the selected resource blocks, when applied to a 3GPP New Radio system the integer value is termed a resource indicator value, RIV.

The above aspects shall now be described in relation to a wireless device which is adapted for switching between an active bandwidth part and a target bandwidth part, wherein each of the respective bandwidth parts comprise one or more resource blocks for use by the wireless device. The wireless device may receive a resource allocation field in a downlink control information in the active bandwidth part, the resource allocation field comprising information bits for allocating the one or more resource blocks in the target bandwidth part. The wireless device interprets the resource allocation information bits based on a target bandwidth part resource allocation type wherein the target bandwidth resource allocation type indicates whether the information bits comprise a bitmap corresponding to one or more resource block groups or an integer value corresponding to a starting position and a length of the allocation. The wireless device then performs switching to the target bandwidth part to for a transmission or reception on the allocated resource blocks. As described above, the resource allocation type may be preconfigured to a type 0 or a type 1, or the wireless device may be preconfigured to be dynamically switched between resource allocation types. When configured to switch between resource allocation types the network node may indicate the resource allocation type to the wireless device or UE in an additional field or subfield of a resource allocation field in a DCI. Each BWP has a separate configuration. In other words, a wireless device may have different resource allocation types preconfigured for each BWP.

The wireless device may interpret the target resource allocation information bits as an integer value corresponding to a starting position and a length of the allocation, corresponding to the allocated resource blocks, when the target bandwidth part resource allocation type is preconfigured for the information bits to represent an integer value corresponding to a starting position and a length of the allocation. The starting position may be a physical resource block, virtual resource block or resource block group (RBG). The length of the resource allocation may be in resource blocks granularity. In other examples the length may be in resource block group granularity.

In another aspect the wireless device interprets the target resource allocation information bits as a bitmap corresponding to the allocated resource blocks when the target bandwidth part resource allocation type is preconfigured for the information bits to represent a bitmap. The bitmap may indicate positions of physical resource blocks, virtual resource blocks or resource block groups. The granularity of the bitmap indication, i.e. the number of resource blocks or resource block groups indicated per bit may be adapted when indicating the resource allocation for a target BWP in a DCI in an active BWP for switching between BWPs. For example as a result of too few bits to indicate all of the available resource blocks/RBGs at the desired granularity the granularity may be reduced as a result of the adaptation.

In the above aspects, for example, the wireless device interprets the resource allocation information bits based on what the target resource allocation type has been preconfigured to; if the target BWP has been preconfigured to a bitmap then the resource allocation information bits in the active BWP DCI for switching between DCIs is configured as a bitmap and if the target BWP has been preconfigured as an integer then the active BWP DCI for switching between DCIs is configured as an integer. The BWP switching may occur between an active BWP configured with any of the above described resource allocation types and may be switched to a target BWP which is likewise configured with any of the above described resource allocation types.

In another aspect the wireless device interprets the target resource allocation information bits as a bitmap corresponding to the allocated resource blocks when the wireless device is preconfigured for dynamic switching between resource allocation types for the target bandwidth part and the target bandwidth part resource allocation type is indicated by a resource allocation type subfield of the resource allocation field in a downlink control information in the target bandwidth part. In this aspect the switching is simplified by avoiding the wireless device detecting the resource allocation type dynamically during the switching. This also has the advantage of providing an additional subfield, e.g. 1 bit, used for allocation in the target BWP which can be used for improving the resource allocation indication when too few bits are available in the DCI in the active BWP to sufficiently identify the scheduled resources in the target BWP during the switching. Again, as described above the bitmap may indicate positions of physical resource blocks, virtual resource blocks or resource block groups. The granularity of the bitmap indication, i.e. the number of resource blocks or resource block groups indicated per bit may be adapted when indicating the resource allocation for a target BWP in a DCI in an active BWP for switching between BWPs. For example, as a result of too few bits to indicate all of the available resource blocks/RBGs at the desired granularity the granularity may be reduced as a result of the adaptation.

In another aspect the wireless device interprets the target resource allocation information bits as an integer value corresponding to a starting position and a length of the allocation, identifying the allocated resource blocks, when the wireless device is preconfigured for dynamic switching between resource allocation types for the target bandwidth part and the target bandwidth part resource allocation type is indicated by a resource allocation type subfield of the resource allocation field in a downlink control information in the target bandwidth part. In this aspect the switching is simplified by avoiding the wireless device interpreting the resource allocation type dynamically during the switching. This also has the advantage of providing an additional subfield, e.g. 1 bit, used for allocation in the target BWP which can be used for improving the resource allocation indication when too few bits are available in the DCI in the active BWP to sufficiently identify the scheduled resources in the target BWP during the switching. Again, as described above, the starting position may be a physical resource block, virtual resource block or resource block group (RBG). The length of the resource allocation may be in resource blocks granularity. In other examples the length may be in resource block group granularity.

In the above aspects, when the target BWP is configured for dynamic resource allocation the resource allocation may be simplified during a BWP switching procedure by using a fixed resource allocation type. The "preconfigured" allocation type used during the BWP switching, i.e. in the DCI in the active BWP, may be preconfigured to one of type 0 or type 1, for example it could be set via radio resource control procedures. In some examples the resource allocation type for the switching procedure may be fixed in a standard specification document. In some examples one type may be preconfigured for switching from a narrowband BWP to a wideband BWP and another type preconfigured for switching from a wideband BWP to a narrowband BWP. If a bitmap (type 0) is selected for the "preconfigured" resource allocation type in the BWP switching the granularity may be reduced but the whole bandwidth may be addressed whereas if an integer (type 1) is selected then potentially a part of the available resources cannot be indicated.

In another aspect the wireless device interprets the target resource allocation information bits to comprise 1 bit for indicating a resource allocation type and interprets the remaining bits as a bitmap or as an integer value corresponding to a starting position and a length of the allocation, identifying the allocated resource blocks, when the wireless device is preconfigured for dynamic switching between resource allocation types for the target bandwidth part and the target bandwidth part resource allocation type is indicated by a resource allocation type subfield of a resource allocation field in a downlink control information in the target bandwidth part.

In any of the above aspects the wireless device may truncate the bits of the resource allocation field or the bits may be padded out, e.g. extra bits applied to the bits of the resource allocation field. The extra padding bits may be predefined/preconfigured in the wireless device.

For example, if the target bandwidth part is configured for a greater number of resource blocks than the number configured for the active bandwidth part and the number of information bits available in the resource allocation field of the downlink control information in the active bandwidth part is less than a number of information bits available in a resource allocation field in the target bandwidth part the wireless device pads out the bits of the resource allocation field. For example, the resource allocation field in the active BWP DCI contains too few bits to identify the scheduled resource and the wireless device adds a number of predefined bits which extend the size of the bitmap or integer value.

In another example, when the target bandwidth part is used to allocate a smaller number of resource blocks than allocated for the active bandwidth part and the number of information bits in the resource allocation field of the downlink control information in the active bandwidth part is greater than a number of information bits in a resource allocation field in the target bandwidth part the wireless device receives more bits than required for resource allocation for the target BWP, the remaining bits of the resource allocation field are truncated, i.e. not used by the wireless when interpreting the information (as either a bitmap or an integer).

Figure 4:
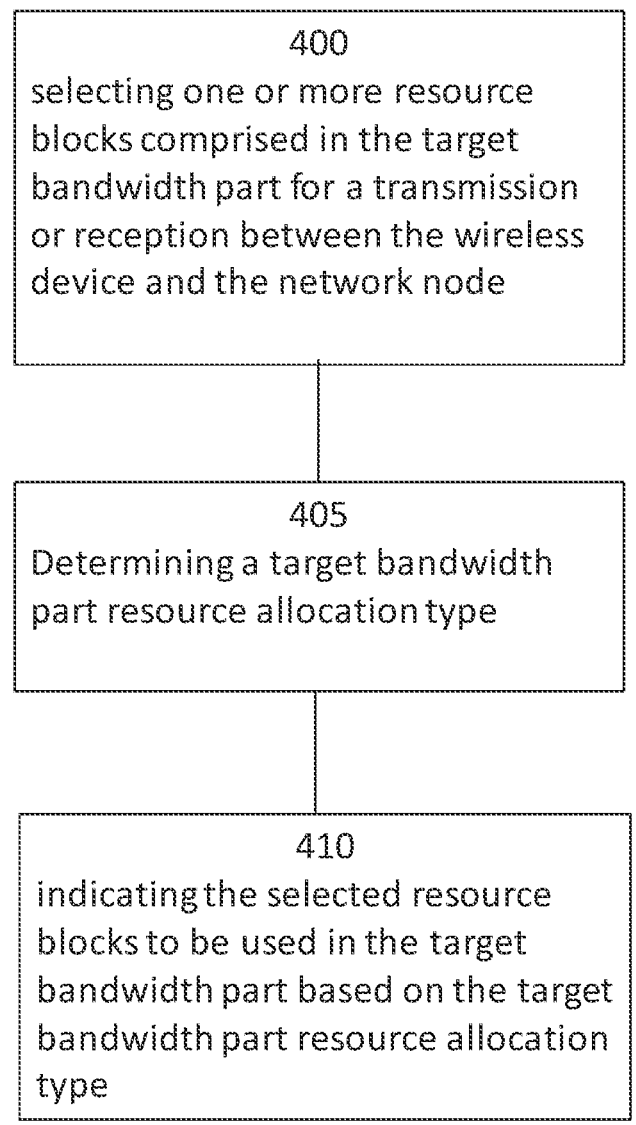
FIG. 4 depicts an exemplary method according to an embodiment of the present application.

The above described aspects may be embodied in a method in a network node as shown in FIG. 4. The method is performed by a network node for switching between an active bandwidth part and a target bandwidth part, wherein each of the respective bandwidth parts comprises one or more resource blocks for use by the wireless device. At step 400 the method comprise the step of selecting one or more resource blocks comprised in the target bandwidth part for a transmission or reception between the wireless device and the network node. At step 405 the network node determines a target bandwidth part resource allocation type. The resource allocation type may be determined for a wireless device which supports dynamic bandwidth part switching based on a relationship between the resources allocated for the target bandwidth part and the resources allocated for the active bandwidth part, for example, if the target bandwidth part is configured for a greater number of resource blocks than the number configured for the active bandwidth part and the number of information bits available in the resource allocation field of the downlink control information in the active bandwidth part is less than a number of information bits available in a resource allocation field in the target bandwidth then the target bandwidth part resource allocation type may be determined by a preconfigured value. At step 410 the method provides the step of indicating the selected resource blocks to be used in the target bandwidth part in a resource allocation field of a downlink control channel information in the active bandwidth part, the allocation field comprising information bits and wherein the resource allocation field in the active bandwidth part and the information bits therein are configured based on the target bandwidth part resource allocation type wherein the target bandwidth part resource allocation type indicates whether the information bits comprise a bitmap corresponding to one or more resource block groups or an integer value corresponding to a starting position and a length of the allocation.

Figure 5:
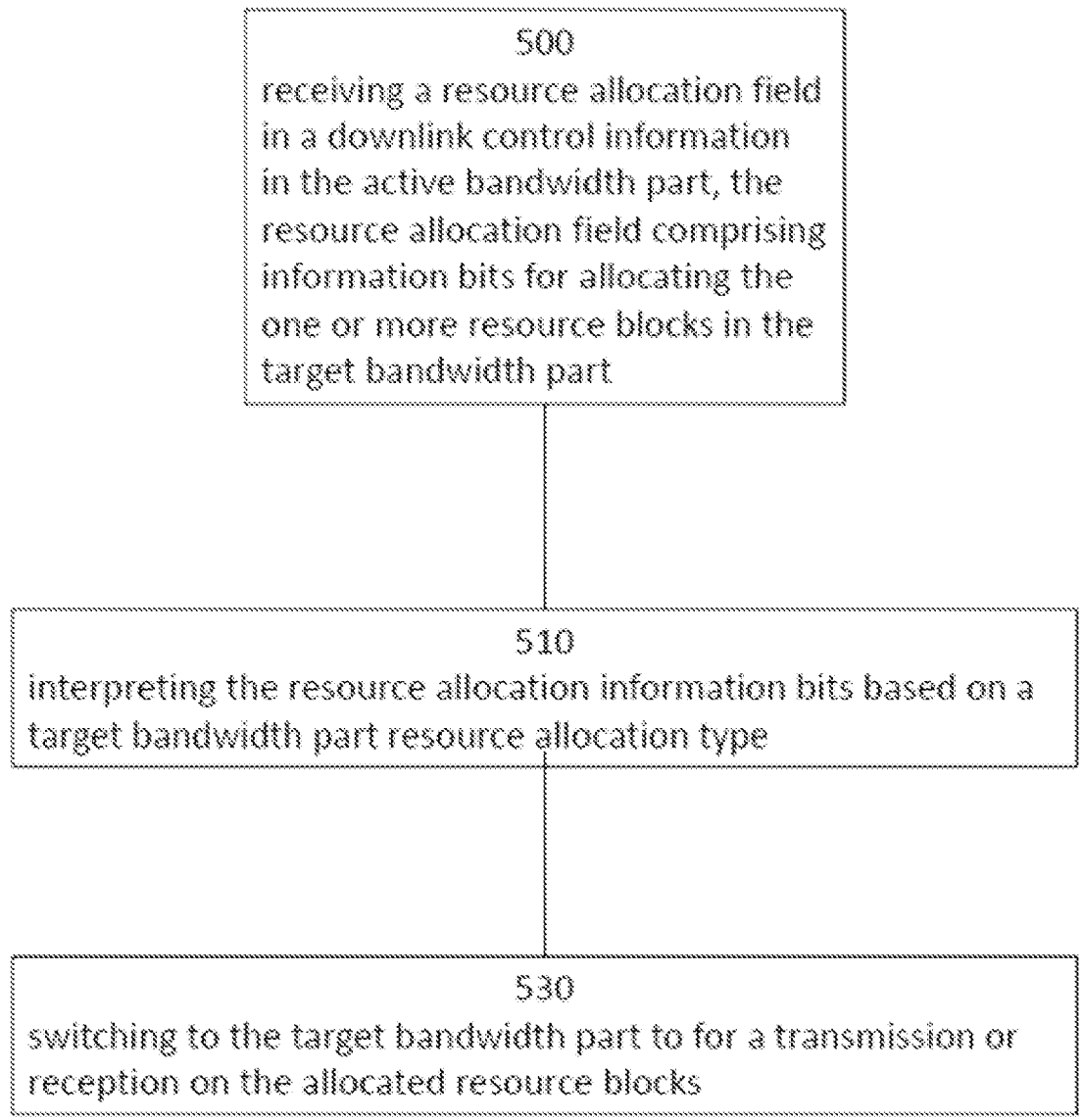
FIG. 5 depicts an exemplary method according to an embodiment of the present application.

In another embodiment a method performed by a wireless device is provided as shown in FIG. 5. The method is performed by a wireless device for switching between an active bandwidth part and a target bandwidth part, wherein each of the respective bandwidth parts comprise one or more resource blocks for use by the wireless device, the method comprises the step 500 of receiving a resource allocation field in a downlink control information in the active bandwidth part, the resource allocation field comprising information bits for allocating the one or more resource blocks in the target bandwidth part. The method proceeds with the step 510 of interpreting the resource allocation information bits based on a target bandwidth part resource allocation type wherein the target bandwidth resource allocation type indicates whether the information bits comprise a bitmap corresponding to one or more resource block groups or an integer value corresponding to a starting position and a length of the allocation. The method then performs the step 520 of switching to the target bandwidth part to for a transmission or reception on the allocated resource blocks.

Figure 6:
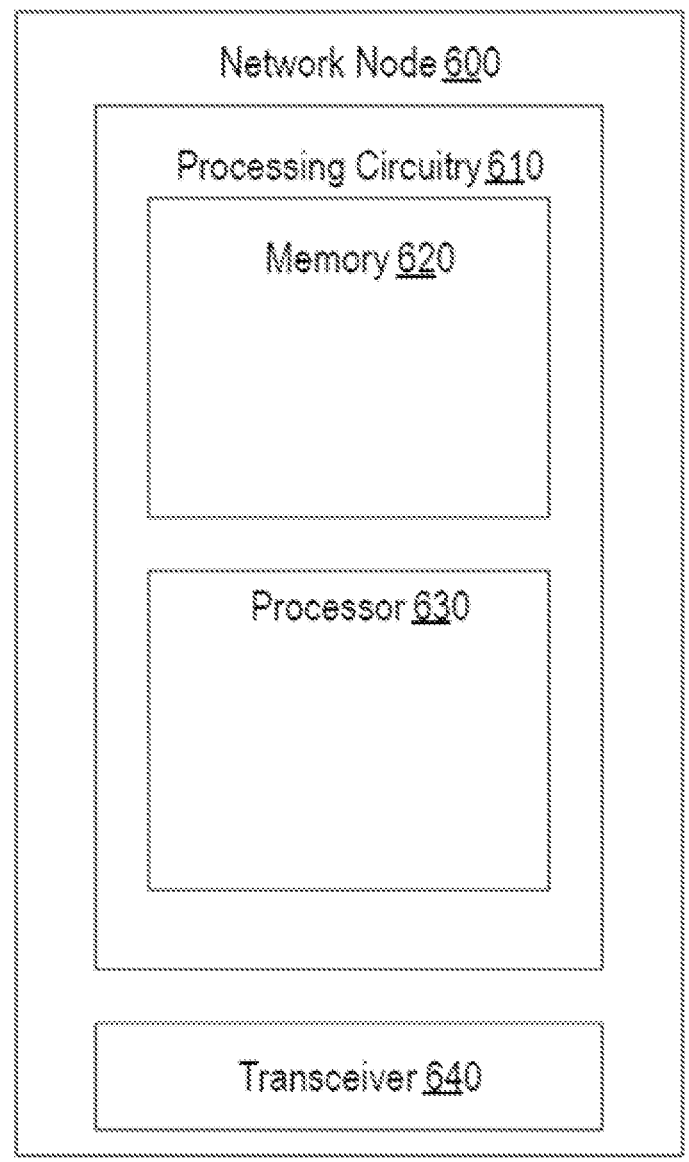
FIG. 6 illustrates a network node for switching between an active bandwidth part and a target bandwidth part.

In other embodiments a network node as depicted in FIG. 6 for switching between an active bandwidth part and a target bandwidth part, wherein each of the respective bandwidth parts comprises one or more resource blocks for use by the wireless device, the network node configured to select one or more resource blocks comprised in the target bandwidth part for a transmission or reception between the wireless device and the network node, indicate the selected resource blocks to be used in the target bandwidth part in a resource allocation field of a downlink control channel information in the active bandwidth part, the allocation field comprising information bits and wherein the resource allocation field in the active bandwidth part and the information bits therein are configured based on a target bandwidth part resource allocation type wherein the target bandwidth part resource allocation type indicates whether the information bits comprise a bitmap corresponding to one or more resource block groups or an integer value corresponding to a starting position and a length of the allocation.

Figure 7:
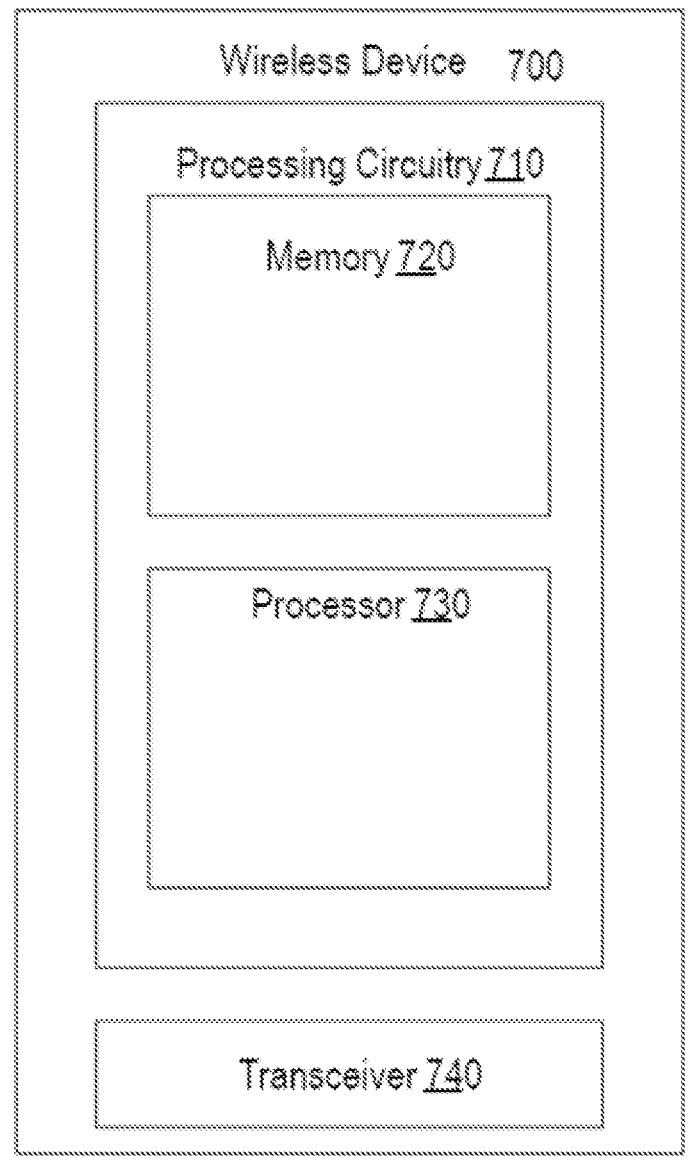
FIG. 7 illustrates a wireless device for switching between an active bandwidth part and a target bandwidth part.

In another embodiment a wireless device for switching between an active bandwidth part and a target bandwidth part as depicted by FIG. 7 is provided. Each of the respective bandwidth parts comprise one or more resource blocks for use by the wireless device, the wireless device configured to receive a resource allocation field in a downlink control information in the active bandwidth part, the resource allocation field comprising information bits for allocating the one or more resource blocks in the target bandwidth part and interpret the resource allocation information bits based on a target bandwidth part resource allocation type wherein the target bandwidth resource allocation type indicates whether the information bits comprise a bitmap corresponding to one or more resource block groups or an integer value corresponding to a starting position and a length of the allocation and switch to the target bandwidth part to for a transmission or reception on the allocated resource blocks.

Network node 600 may be composed of multiple physically separate components (e.g., a NodeB component and a RNC component, or a BTS component and a BSC component, etc.), which may each have their own respective components. In certain scenarios in which network node 600 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 600 may be configured to support multiple radio access technologies (RATs). In such embodiments, some components may be duplicated (e.g., separate device readable medium for the different RATs) and some components may be reused (e.g., the same antenna may be shared by the RATs). Network node 600 may also include multiple sets of the various illustrated components for different wireless technologies integrated into network node 600, such as, for example, GSM, WCDMA, LTE, NR, WiFi, or Bluetooth wireless technologies. These wireless technologies may be integrated into the same or different chip or set of chips and other components within a network node.

Processing circuitry 630 is configured to perform any determining, calculating, or similar operations (e.g., certain obtaining operations) described herein as being provided by a network node. These operations performed by processing circuitry 630 may include processing information obtained by processing circuitry 630 by, for example, converting the obtained information into other information, comparing the obtained information or converted information to information stored in the network node, and/or performing one or more operations based on the obtained information or converted information, and as a result of said processing making a determination.

Processing circuitry 630 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 600 components, such as device readable medium, network node 600 functionality. For example, processing circuitry 630 may execute instructions stored in device readable medium or in memory 620 within processing circuitry 630. Such functionality may include providing any of the various wireless features, functions, or benefits discussed herein. In some embodiments, processing circuitry 630 may include a system on a chip (SOC).

In some embodiments, processing circuitry 630 may include one or more of radio frequency (RF) transceiver circuitry 640 and baseband processing circuitry. In some embodiments, radio frequency (RF) transceiver circuitry 640 and baseband processing circuitry may be on separate chips (or sets of chips), boards, or units, such as radio units and digital units. In alternative embodiments, part or all of RF transceiver circuitry 640 and baseband processing circuitry may be on the same chip or set of chips, boards, or units In certain embodiments, some or all of the functionality described herein as being provided by a network node, base station, eNB or other such network device may be performed by processing circuitry 630 executing instructions stored on device readable medium 620 or memory within processing circuitry 630. In alternative embodiments, some or all of the functionality may be provided by processing circuitry 630 without executing instructions stored on a separate or discrete device readable medium, such as in a hard-wired manner. In any of those embodiments, whether executing instructions stored on a device readable storage medium or not, processing circuitry 630 can be configured to perform the described functionality. The benefits provided by such functionality are not limited to processing circuitry 630 alone or to other components of network node 600, but are enjoyed by network node 600 as a whole, and/or by end users and the wireless network generally.

Device readable medium 620 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 630. Device readable medium 620 may store any suitable instructions, data or information, including a computer program, software, an application including one or more of logic, rules, code, tables, etc. and/or other instructions capable of being executed by processing circuitry 630 and, utilized by network node 600. Device readable medium 620 may be used to store any calculations made by processing circuitry 630 and/or any data received via an interface. In some embodiments, processing circuitry 630 and device readable medium 620 may be considered to be integrated.

The functions can be implemented by one or more applications (which can alternatively be called software instances, virtual appliances, network functions, virtual nodes, virtual network functions, etc.) operative to implement some of the features, functions, and/or benefits of some of the embodiments disclosed herein. Applications are run in virtualization environment which provides hardware comprising processing circuitry and memory. Memory contains instructions executable by processing circuitry whereby application is operative to provide one or more of the features, benefits, and/or functions disclosed herein.

Virtualization environment, comprises general-purpose or special-purpose network hardware devices comprising a set of one or more processors or processing circuitry, which can be commercial off-the-shelf (COTS) processors, dedicated Application Specific Integrated Circuits (ASICs), or any other type of processing circuitry including digital or analog hardware components or special purpose processors. Each hardware device can comprise memory which can be non-persistent memory for temporarily storing instructions or software executed by processing circuitry. Each hardware device can comprise one or more network interface controllers (NICs), also known as network interface cards, which include physical network interface. Each hardware device can also include non-transitory, persistent, machine-readable storage media having stored therein software and/or instructions executable by processing circuitry. Software can include any type of software including software for instantiating one or more virtualization layers (also referred to as hypervisors), software to execute virtual machines as well as software allowing it to execute functions, features and/or benefits described in relation with some embodiments described herein.

Virtual machines, comprise virtual processing, virtual memory, virtual networking or interface and virtual storage, and can be run by a corresponding virtualization layer or hypervisor. Different embodiments of the instance of virtual appliance can be implemented on one or more of virtual machines, and the implementations can be made in different ways.

During operation, processing circuitry executes software to instantiate the hypervisor or virtualization layer, which can sometimes be referred to as a virtual machine monitor (VMM). Virtualization layer can present a virtual operating platform that appears like networking hardware to virtual machine.

Hardware can be a standalone network node with generic or specific components. Hardware can comprise antenna and can implement some functions via virtualization. Alternatively, hardware can be part of a larger cluster of hardware (e.g. such as in a data center or customer premise equipment (CPE)) where many hardware nodes work together and are managed via management and orchestration (MANO), which, among others, oversees lifecycle management of applications.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine can be a software implementation of a physical machine that runs programs as if they were executing on a physical, non-virtualized machine. Each of virtual machines, and that part of hardware that executes that virtual machine, be it hardware dedicated to that virtual machine and/or hardware shared by that virtual machine with others of the virtual machines, forms a separate virtual network elements (VNE).

Still in the context of NFV, Virtual Network Function (VNF) is responsible for handling specific network functions that run in one or more virtual machines on top of hardware networking infrastructure.

In some embodiments, one or more radio units that each include one or more transmitters and one or more receivers can be coupled to one or more antennas. Radio units can communicate directly with hardware nodes via one or more appropriate network interfaces and can be used in combination with the virtual components to provide a virtual node with radio capabilities, such as a radio access node or a base station.

In some embodiments, some signalling can be effected with the use of control system which can alternatively be used for communication between the hardware nodes and radio units.

Figure 8:
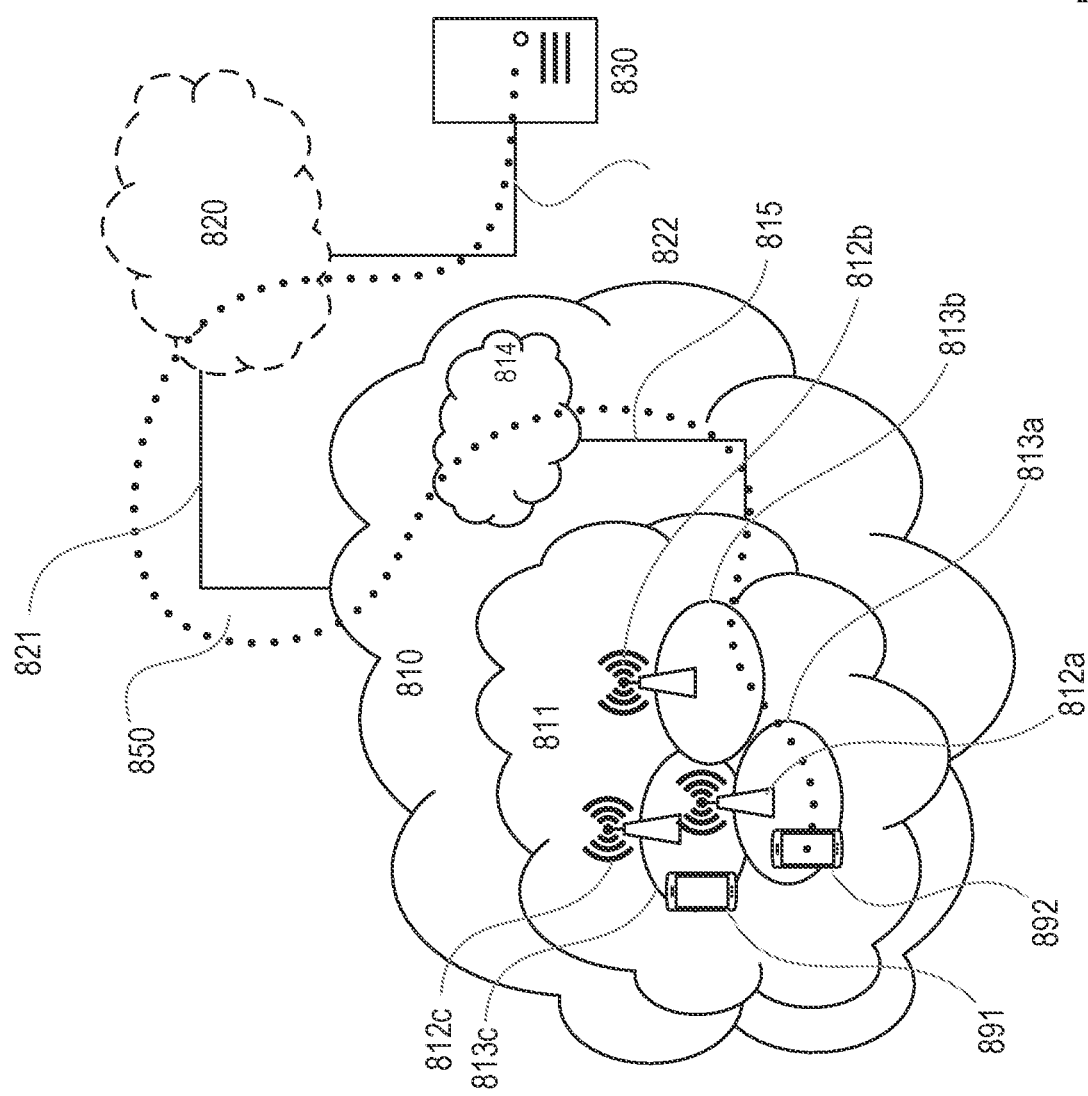
FIG. 8: Telecommunication network connected via an intermediate network to a host computer in accordance with some embodiments

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812*a*, 812*b*, 812*c*, such as NB s, eNBs, gNBs or other types of wireless access points, each defining a corresponding coverage area 813*a*, 813*b*, 813*c*. Each base station 812*a*, 812*b*, 812*c* is connectable to core network 814 over a wired or wireless connection 815. A first UE 891 located in coverage area 813*c* can be configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which can be embodied in the hardware and/or software of a standalone server, a cloud-implemented server, a distributed server or as processing resources in a server farm. Host computer 830 can be under the ownership or control of a service provider, or can be operated by the service provider or on behalf of the service provider. Connections 821 and 822 between telecommunication network 810 and host computer 830 can extend directly from core network 814 to host computer 830 or can go via an optional intermediate network 820. Intermediate network 820 can be one of, or a combination of more than one of, a public, private or hosted network; intermediate network 820, if any, can be a backbone network or the Internet; in particular, intermediate network 820 can comprise two or more sub-networks (not shown).

The communication system of FIG. 8 as a whole enables connectivity between the connected UEs 891, 892 and host computer 830. The connectivity can be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 can be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which can have storage and/or processing capabilities. In particular, processing circuitry 918 can comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 can be operable to provide a service to a remote user, such as UE 930 connecting via OTT connection 950 terminating at UE 930 and host computer 910. In providing the service to the remote user, host application 912 can provide user data which is transmitted using OTT connection 950.

Communication system 900 can also include base station 920 provided in a telecommunication system and comprising hardware 925 enabling it to communicate with host computer 910 and with UE 930. Hardware 925 can include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 can be configured to facilitate connection 960 to host computer 910. Connection 960 can be direct or it can pass through a core network (not shown in FIG. 9) of the telecommunication system and/or through one or more intermediate networks outside the telecommunication system. In the embodiment shown, hardware 925 of base station 920 can also include processing circuitry 928, which can comprise one or more programmable processors, application-specific integrated circuits, field programmable gate arrays or combinations of these (not shown) adapted to execute instructions. Base station 920 further has software 921 stored internally or accessible via an external connection.

Communication system 900 can also include UE 930 already referred to. Its hardware 935 can include radio interface 937 configured to set up and maintain wireless connection 970 with a base station serving a coverage area in which UE 930 is currently located. Hardware 935 of UE 930 can also include processing circuitry 938, which can comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 can be operable to provide a service to a human or non-human user via UE 930, with the support of host computer 910. In host computer 910, an executing host application 912 can communicate with the executing client application 932 via OTT connection 950 terminating at UE 930 and host computer 910. In providing the service to the user, client application 932 can receive request data from host application 912 and provide user data in response to the request data. OTT connection 950 can transfer both the request data and the user data. Client application 932 can interact with the user to generate the user data that it provides.

Figure 9:
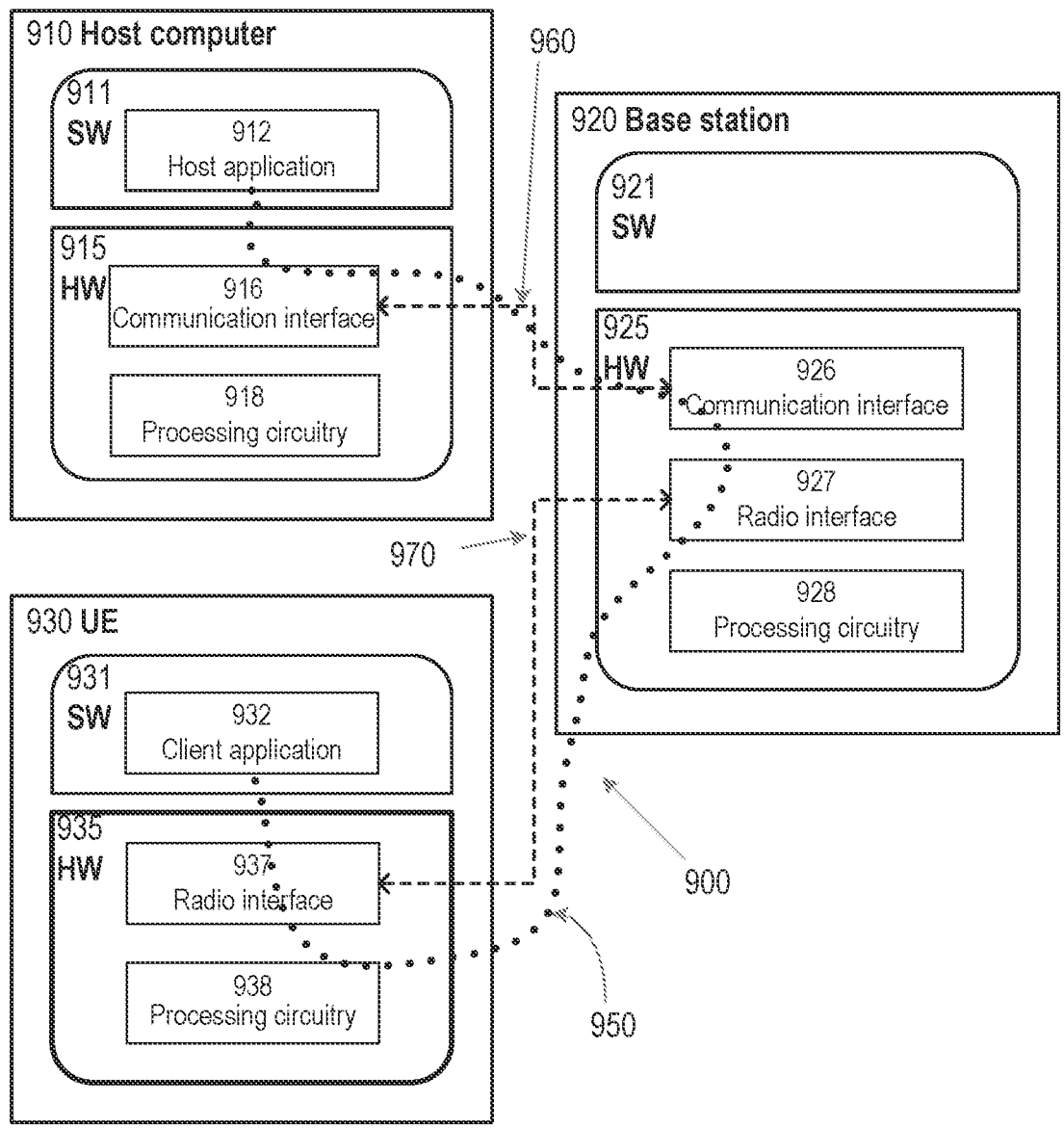
FIG. 9: Host computer communicating via a base station with a user equipment over a partially wireless connection in accordance with some embodiments

It is noted that host computer 910, base station 920 and UE 930 illustrated in FIG. 9 can be similar or identical to host computer 830, one of base stations 812a, 812b, 812c and one of UEs 891, 892 of FIG. 8, respectively. This is to say, the inner workings of these entities can be as shown in FIG. 9 and independently, the surrounding network topology can be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure can determine the routing, which it can be configured to hide from UE 930 or from the service provider operating host computer 910, or both. While OTT connection 950 is active, the network infrastructure can further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, and in particular latency, for example when data transmission requirements vary dynamically within an OTT service which are implemented using multiple bandwidth parts and thus require efficient bandwidth part switching. BWP switching provides support for the many OTT services that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 950 between host computer 910 and UE 930, in response to variations in the measurement results. The measurement procedure and/or the network functionality for reconfiguring OTT connection 950 can be implemented in software 911 and hardware 915 of host computer 910 or in software 931 and hardware 935 of UE 930, or both. In embodiments, sensors (not shown) can be deployed in or in association with communication devices through which OTT connection 950 passes; the sensors can participate in the measurement procedure by supplying values of the monitored quantities exemplified above, or supplying values of other physical quantities from which software 911, 931 can compute or estimate the monitored quantities. The reconfiguring of OTT connection 950 can include message format, retransmission settings, preferred routing etc.; the reconfiguring need not affect base station 920, and it can be unknown or imperceptible to base station 920. Such procedures and functionalities can be known and practiced in the art. In certain embodiments, measurements can involve proprietary UE signaling facilitating host computer 910's measurements of throughput, propagation times, latency and the like. The measurements can be implemented in that software 911 and 931 causes messages to be transmitted, in particular empty or 'dummy' messages, using OTT connection 950 while it monitors propagation times, errors etc.

Figure 10:
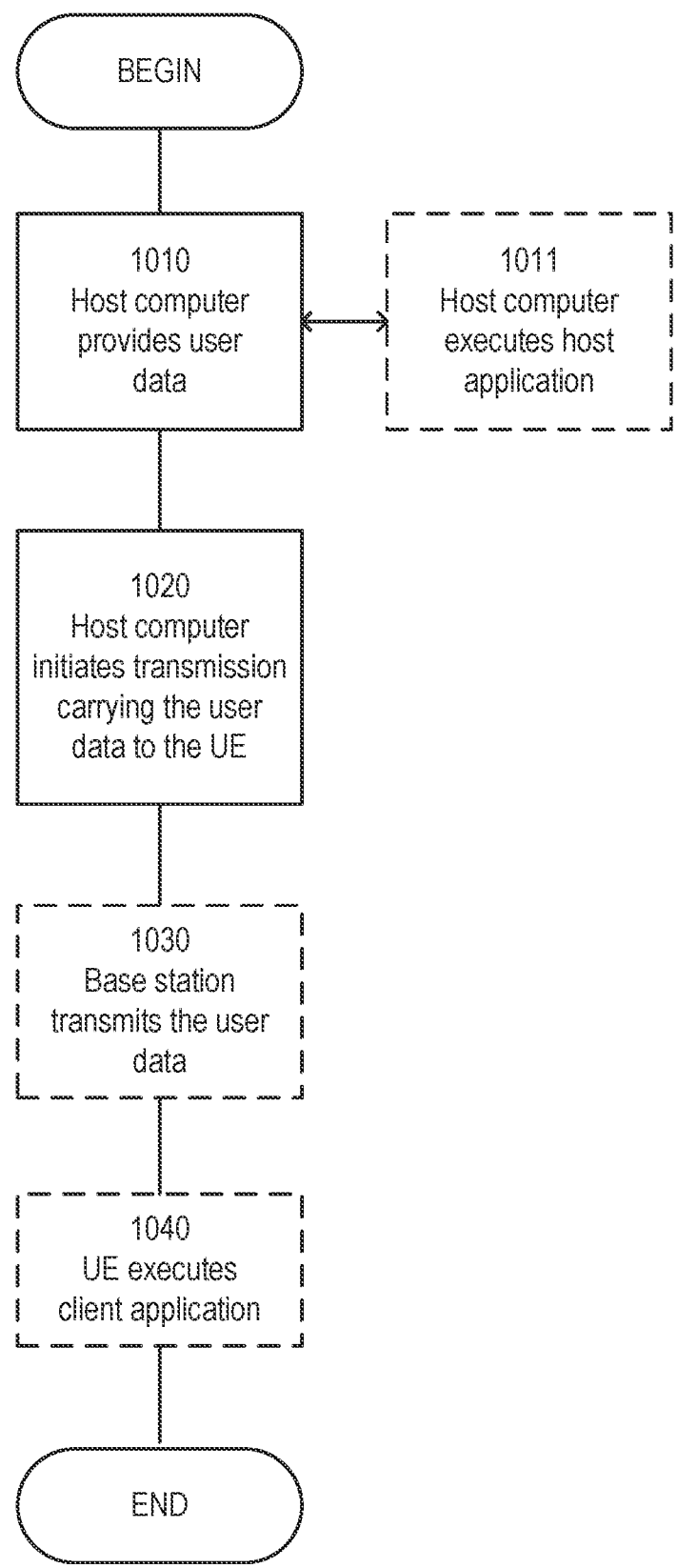
FIG. 10: Methods and/or procedures implemented in a communication system including a host computer, a base station and a user equipment in accordance with some embodiments

FIG. 10 is a flowchart illustrating an exemplary method and/or procedure implemented in a communication system, in accordance with one embodiment. The communication system includes a host computer, a base station and a UE which, in some exemplary embodiments, can be those described with reference to FIGS. 8 and 9. For simplicity of the present disclosure, only drawing references to FIG. 10 will be included in this section. In step 1010, the host computer provides user data. In substep 1011 (which can be optional) of step 1010, the host computer provides the user data by executing a host application. In step 1020, the host computer initiates a transmission carrying the user data to the UE. In step 1030 (which can be optional), the base station transmits to the UE the user data which was carried in the transmission that the host computer initiated, in accordance with the teachings of the embodiments described throughout this disclosure. In step 1040 (which can also be optional), the UE executes a client application associated with the host application executed by the host computer.

Figure 11:
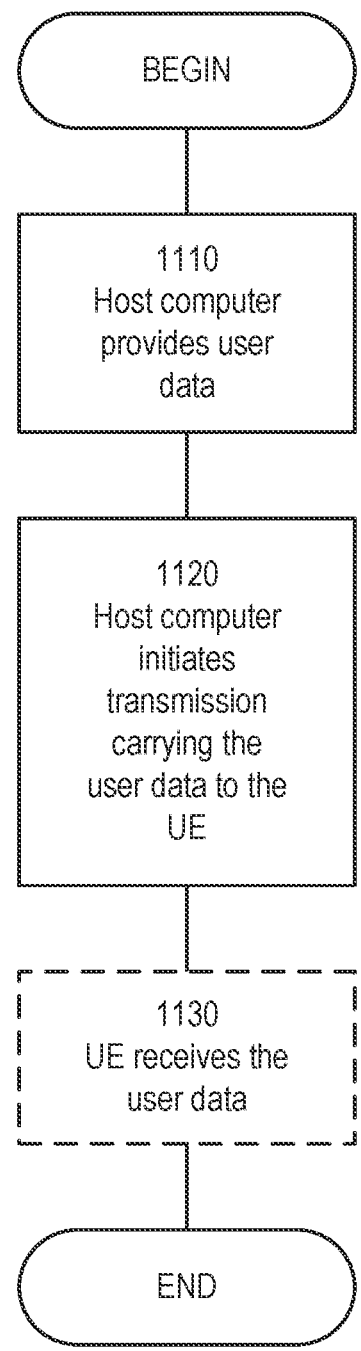
FIG. 11: Methods and/or procedures implemented in a communication system including a host computer, a base station and a user equipment in accordance with some embodiments.

FIG. 11 is a flowchart illustrating an exemplary method and/or procedure implemented in a communication system, in accordance with one embodiment. The communication system includes a host computer, a base station and a UE which can be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission can pass via the base station, in accordance with the teachings of the embodiments described throughout this disclosure. In step 1130 (which can be optional), the UE receives the user data carried in the transmission.

Figure 12:
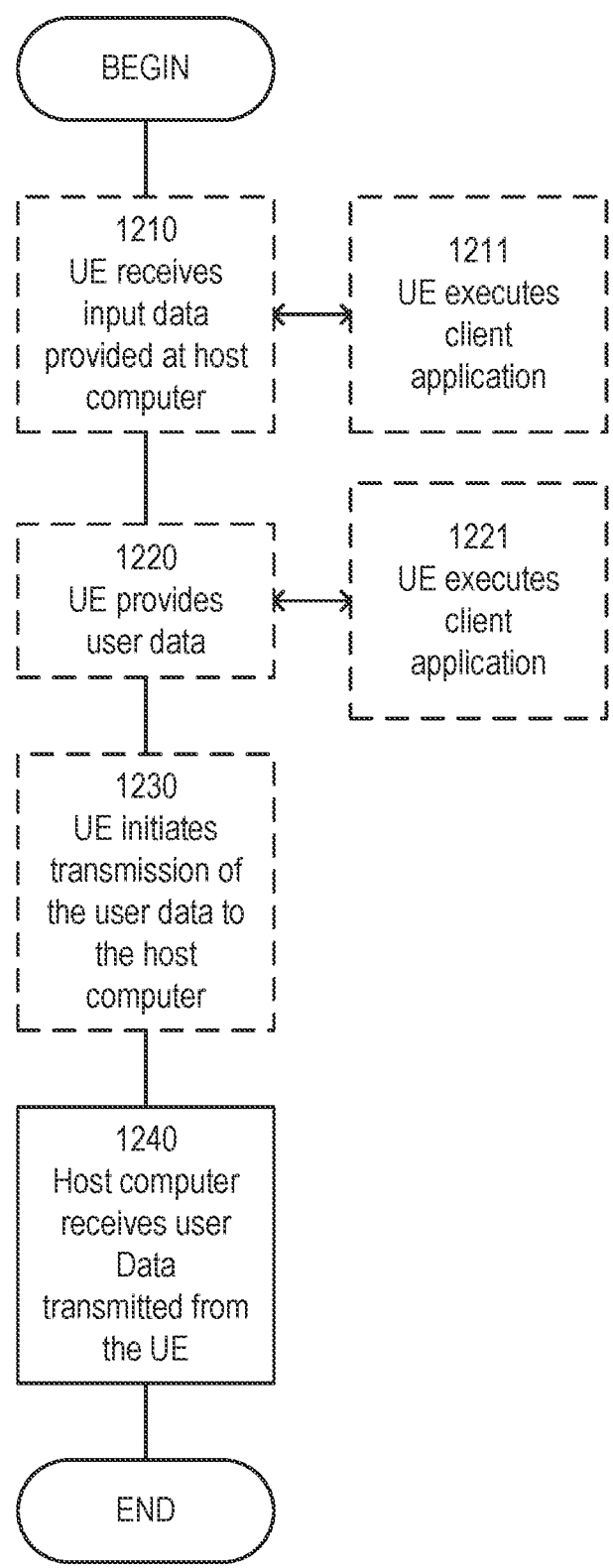
FIG. 12: Methods and/or procedures implemented in a communication system including a host computer, a base station and a user equipment in accordance with some embodiments

FIG. 12 is a flowchart illustrating an exemplary method and/or procedure implemented in a communication system, in accordance with one embodiment. The communication system includes a host computer, a base station and a UE which can be those described with reference to FIGS. 8 and 9. For simplicity of the present disclosure, only drawing references to FIG. 12 will be included in this section. In step 1210 (which can be optional), the UE receives input data provided by the host computer. Additionally or alternatively, in step 1220, the UE provides user data. In substep 1221 (which can be optional) of step 1220, the UE provides the user data by executing a client application. In substep 1211 (which can be optional) of step 1210, the UE executes a client application which provides the user data in reaction to the received input data provided by the host computer. In providing the user data, the executed client application can further consider user input received from the user. Regardless of the specific manner in which the user data was provided, the UE initiates, in substep 1230 (which can be optional), transmission of the user data to the host computer. In step 1240 of the method, the host computer receives the user data transmitted from the UE, in accordance with the teachings of the embodiments described throughout this disclosure.

Figure 13:
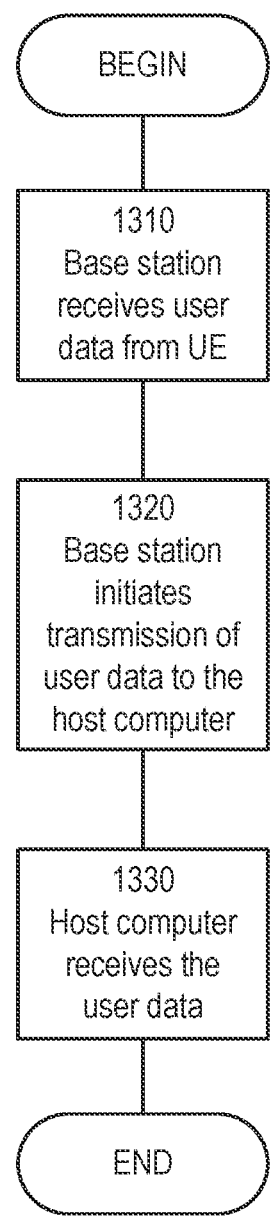
FIG. 13: Methods and/or procedures implemented in a communication system including a host computer, a base station and a user equipment in accordance with some embodiments

FIG. 13 is a flowchart illustrating an exemplary method and/or procedure implemented in a communication system, in accordance with one embodiment. The communication system includes a host computer, a base station and a UE which can be those described with reference to FIGS. 8 and 9. For simplicity of the present disclosure, only drawing references to FIG. 13 will be included in this section. In step 1310 (which can be optional), in accordance with the teachings of the embodiments described throughout this disclosure, the base station receives user data from the UE. In step 1320 (which can be optional), the base station initiates transmission of the received user data to the host computer. In step 1330 (which can be optional), the host computer receives the user data carried in the transmission initiated by the base station.

Further examples of the aspects disclosed herein are listed below.

Example 1. A method performed by a network node for switching between an active bandwidth part and a target bandwidth part, wherein each of the respective bandwidth parts comprises one or more resource blocks for use by the wireless device, the method comprising:

selecting one or more resource blocks comprised in the target bandwidth part for a transmission or reception between the wireless device and the network node;

indicating the selected resource blocks to be used in the target bandwidth part in a resource allocation field of a downlink control channel information in the active bandwidth part, the allocation field comprising information bits and wherein the resource allocation field in the active bandwidth part and the information bits therein are configured based on a target bandwidth part resource allocation type wherein the target bandwidth part resource allocation type indicates whether the information bits comprise a bitmap corresponding to one or more resource block groups or an integer value corresponding to a starting position and a length of the allocation.

Example 2. The method of Example 1, configuring the target resource allocation information bits as an integer value corresponding to a starting position and a length of the allocation, corresponding to the selected resource blocks, when the target bandwidth part resource allocation type is preconfigured for the information bits to represent an integer value corresponding to a starting position and a length of the allocation.

Example 3. The method of Example 1, configuring the target resource allocation information bits as a bitmap corresponding to the selected resource blocks when the target bandwidth part resource allocation type is preconfigured for the information bits to represent a bitmap.

Example 4. The method of Example 1, configuring the target resource allocation information bits as a bitmap corresponding to the selected resource blocks when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 5. The method of Example 1, configuring the target resource allocation information bits as an integer value corresponding to a starting position and a length of the allocation, corresponding to the selected resource blocks, when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 6. The method of Example 1, configuring the target resource allocation information bits to comprise 1 bit for indicating a resource allocation type and configuring the remaining bits as a bitmap or as an integer value corresponding to a starting position and a length of the allocation, corresponding to the selected resource blocks, when the wireless device is preconfigured for dynamic switching between resource allocation types for the target bandwidth part and the target bandwidth part resource allocation type is indicated by a resource allocation type subfield of a resource allocation field in a downlink control information in the target bandwidth part.

Example 7. The method of any of the preceding Examples, further comprising truncating the remaining bits of the resource allocation field or padding the bits of the resource allocation field.

Example 8. The method of any of the preceding Examples wherein the target bandwidth part is used to allocate a greater number of resource blocks than allocated for the active bandwidth part and the number of information bits in the resource allocation field of the downlink control information in the active bandwidth part is less than a number of information bits in a resource allocation field in the target bandwidth part and the bits of the resource allocation field are padded.

Example 9. The method of any of the Examples 1 to 7, wherein the target bandwidth part is used to allocate a smaller number of resource blocks than allocated for the active bandwidth part and the number of information bits in the resource allocation field of the downlink control information in the active bandwidth part is greater than a number of information bits in a resource allocation field in the target bandwidth part and the remaining bits of the resource allocation field are truncated.

Example 10. The method of any of the preceding Examples, wherein the resource allocation field of the downlink control information in the active bandwidth part further comprises a bandwidth part indicator, for instructing the wireless device to switch to the target bandwidth part.

Example 11. The method of any of the preceding Examples, wherein the information bits are configured independently of a resource allocation type associated with the active bandwidth part.

Example 12. The method of any of the preceding Examples, wherein the integer value corresponding to a starting position and a length of the allocation, corresponding to the selected resource blocks is a NR resource indicator value, RIV.

Example 13. The method of any of the preceding Examples, wherein the active bandwidth part is for a narrowband service and the target bandwidth part is for a wideband service.

Example 14. A method in a wireless device for switching between an active bandwidth part and a target bandwidth part, wherein each of the respective bandwidth parts comprise one or more resource blocks for use by the wireless device, the method comprising:
  receiving a resource allocation field in a downlink control information in the active bandwidth part, the resource allocation field comprising information bits for allocating the one or more resource blocks in the target bandwidth part; and
  interpreting the resource allocation information bits based on a target bandwidth part resource allocation type wherein the target bandwidth resource allocation type indicates whether the information bits comprise a bitmap corresponding to one or more resource block groups or an integer value corresponding to a starting position and a length of the allocation; and
  switching to the target bandwidth part to for a transmission or reception on the allocated resource blocks.

Example 15. The method of Example 14, interpreting the target resource allocation information bits as an integer value corresponding to a starting position and a length of the allocation, corresponding to the allocated resource blocks, when the target bandwidth part resource allocation type is preconfigured for the information bits to represent an integer value corresponding to a starting position and a length of the allocation.

Example 16. The method of Example 14, interpreting the target resource allocation information bits as a bitmap corresponding to the allocated resource blocks when the target bandwidth part resource allocation type is preconfigured for the information bits to represent a bitmap.

Example 17. The method of Example 14, interpreting the target resource allocation information bits as a bitmap corresponding to the allocated resource blocks when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 18. The method of Example 14, interpreting the target resource allocation information bits as an integer value corresponding to a starting position and a length of the allocation, identifying the allocated resource blocks, when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 19. The method of Example 14, interpreting the target resource allocation information bits to comprise 1 bit for indicating a resource allocation type and configuring the remaining bits as a bitmap or as an integer value corresponding to a starting position and a length of the allocation, identifying the allocated resource blocks, when the wireless device is preconfigured for dynamic switching between resource allocation types for the target bandwidth part and the target bandwidth part resource allocation type is indicated by a resource allocation type subfield of a resource allocation field in a downlink control information in the target bandwidth part.

Example 20. The method of any one of the Examples 14 to 19, further comprising interpreting the bits of the resource allocation field when the resource allocation field is truncated or padded.

Example 21. The method of any one of the Examples 14 to 20, wherein the target bandwidth part is configured for a greater number of resource blocks than the number configured for the active bandwidth part and the number of information bits available in the resource allocation field of the downlink control information in the active bandwidth part is less than a number of information bits available in a resource allocation field in the target bandwidth part and the bits of the resource allocation field are padded.

Example 22. The method of any one of the Examples 14 to 20, wherein the target bandwidth part is used to allocate a smaller number of resource blocks than allocated for the active bandwidth part and the number of information bits in the resource allocation field of the downlink control information in the active bandwidth part is greater than a number of information bits in a resource allocation field in the target bandwidth part and the remaining bits of the resource allocation field are truncated.

Example 23. The method of any one of the Examples 14 to 22, wherein the resource allocation field of the downlink control information in the active bandwidth part further comprises a bandwidth part indicator, for instructing the wireless device to switch to the target bandwidth part.

Example 24. The method of any one of the Examples 14 to 23, wherein the information bits are configured independently of a resource allocation type associated with the active bandwidth part.

Example 25. The method of any one of the Examples 14 to 24, wherein the integer value corresponding to a starting position and a length of the allocation, corresponding to the selected resource blocks is a NR resource indicator value, RIV.

Example 26. The method of any one of the Examples 14 to 25, wherein the active bandwidth part is for a narrowband service and the target bandwidth part is for a wideband service.

Example 27. A network node for switching between an active bandwidth part and a target bandwidth part, wherein each of the respective bandwidth parts comprises one or more resource blocks for use by the wireless device, the network node configured to:
  select one or more resource blocks comprised in the target bandwidth part for a transmission or reception between the wireless device and the network node;
  indicate the selected resource blocks to be used in the target bandwidth part in a resource allocation field of a downlink control channel information in the active bandwidth part, the allocation field comprising information bits and wherein the resource allocation field in the active bandwidth part and the information bits therein are configured based on a target bandwidth part resource allocation type wherein the target bandwidth part resource allocation type indicates whether the information bits comprise a bitmap corresponding to one or more resource block groups or an integer value corresponding to a starting position and a length of the allocation.

Example 28. The network node of Example 27, configuring the target resource allocation information bits as an integer value corresponding to a starting position and a length of the allocation, corresponding to the selected resource blocks, when the target bandwidth part resource allocation type is preconfigured for the information bits to represent an integer value corresponding to a starting position and a length of the allocation.

Example 29. The network node of Example 27, configuring the target resource allocation information bits as a bitmap corresponding to the selected resource blocks when the target bandwidth part resource allocation type is preconfigured for the information bits to represent a bitmap.

Example 30. The network node of Example 27, configuring the target resource allocation information bits as a bitmap corresponding to the selected resource blocks when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 31. The network node of Example 27, configuring the target resource allocation information bits as an integer value corresponding to a starting position and a length of the allocation, corresponding to the selected resource blocks, when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 32. The network node of Example 27, configuring the target resource allocation information bits to comprise 1 bit for indicating a resource allocation type and configuring the remaining bits as a bitmap or as an integer value corresponding to a starting position and a length of the allocation, corresponding to the selected resource blocks, when the wireless device is preconfigured for dynamic switching between resource allocation types for the target bandwidth part and the target bandwidth part resource allocation type is indicated by a resource allocation type subfield of a resource allocation field in a downlink control information in the target bandwidth part.

Example 33. The network node of any of the Examples 27 to 32, further comprising truncating remaining bits of the resource allocation field or padding the bits of the resource allocation field.

Example 34. A wireless device for switching between an active bandwidth part and a target bandwidth part, wherein each of the respective bandwidth parts comprise one or more resource blocks for use by the wireless device, the wireless device configured to:
  receive a resource allocation field in a downlink control information in the active bandwidth part, the resource allocation field comprising information bits for allocating the one or more resource blocks in the target bandwidth part; and interpret the resource allocation information bits based on a target bandwidth part resource allocation type wherein the target bandwidth resource allocation type indicates whether the information bits comprise a bitmap corresponding to one or more resource block groups or an integer value corresponding to a starting position and a length of the allocation; and switch to the target bandwidth part to for a transmission or reception on the allocated resource blocks.

Example 35. The wireless device of Example 34, interpreting the target resource allocation information bits as an integer value corresponding to a starting position and a length of the allocation, identifying the allocated resource blocks, when the target bandwidth part resource allocation type is preconfigured for the information bits to represent an integer value corresponding to a starting position and a length of the allocation.

Example 36. The wireless device of Example 34, interpreting the target resource allocation information bits as a bitmap corresponding to the allocated resource blocks when the target bandwidth part resource allocation type is preconfigured for the information bits to represent a bitmap.

Example 37. The wireless device of Example 34, interpreting the target resource allocation information bits as a bitmap corresponding to the allocated resource blocks when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 38. The wireless device of Example 34, interpreting the target resource allocation information bits as an integer value corresponding to a starting position and a length of the allocation, identifying the allocated resource blocks, when the wireless device is preconfigured for dynamic switching between resource allocation types for the target bandwidth part and the target bandwidth part resource allocation type is indicated by a resource allocation type subfield of the resource allocation field in a downlink control information in the target bandwidth part.

Example 39. The wireless device of Example 34, interpreting the target resource allocation information bits to comprise 1 bit for indicating a resource allocation type and configuring the remaining bits as a bitmap or as an integer value corresponding to a starting position and a length of the allocation, identifying the allocated resource blocks, when the wireless device is preconfigured for dynamic switching between resource allocation types for the target bandwidth part and the target bandwidth part resource allocation type is indicated by a resource allocation type subfield of a resource allocation field in a downlink control information in the target bandwidth part.

Example 40. The wireless device of any one of the Examples 34 to 39, further comprising interpreting the bits of the resource allocation field when the resource allocation field is truncated or padded.

Example 41. A computer program, computer program product or carrier configured to perform any one of the methods of Examples 1 to 13.

Example 42. A computer program, computer program product or carrier configured to perform any one of the methods of Examples 14 to 26.

The invention claimed is:

1. A method performed by a user equipment, UE, configured for dynamic bandwidth part, BWP, switching between an active BWP and a target BWP, the method comprising:

receiving, from a network node, an indication of resource blocks, selected by the network node to be used by the UE in the target BWP, in a resource allocation field of a downlink control information in the active BWP, the resource allocation field comprising information bits for allocating one or more resource blocks for the target BWP;

determining a target BWP resource allocation type based on a relationship between the resources allocated for the target BWP and resources allocated for the active BWP, the target BWP resource allocation type indicating whether the information bits of a resource allocation field in a downlink control information comprise a bitmap corresponding to one or more resource block groups or an integer value corresponding to a starting position and a length of the allocation; and interpreting the information bits based on the determined target bandwidth part resource allocation type.

2. The method of claim 1, wherein the relationship corresponds to a difference in a number of information bits in the resource allocation field of the downlink control information in the active BWP compared to a number of information bits in a resource allocation field for the target BWP.

3. The method of claim 1, wherein the target BWP resource allocation type is preconfigured to a value according to the relationship.

4. The method of claim 1, further comprising interpreting the bits of the resource allocation field when the resource allocation field is truncated or padded.

5. The method of claim 1, wherein:

the target BWP is configured for a greater number of resource blocks than the number configured for the active BWP and the number of information bits available in the resource allocation field of the downlink control information in the active BWP is less than a number of information bits available in a resource allocation field in the target BWP and the bits of the resource allocation field are padded.

6. The method of claim 1, wherein:

the target BWP is used to allocate a smaller number of resource blocks than allocated for the active BWP and the number of information bits in the resource allocation field of the downlink control information in the active BWP is greater than a number of information bits in a resource allocation field in the target BWP and the remaining bits of the resource allocation field are truncated.

7. A method performed by a network node for switching between an active bandwidth part, BWP, and a target BWP, for a user equipment, UE, which supports dynamic bandwidth part switching based on a relationship between resources allocated for the target BWP and resources allocated for the active BWP, the method comprising:

indicating to the UE, the resource blocks, selected by the network node to be used in the target BWP in a resource allocation in a field of a downlink control channel information in an active BWP, the allocation field comprising information bits configured according to a target BWP resource allocation type, the target BWP resource allocation type indicating whether information bits of a resource allocation field in a downlink control information comprise a bitmap corresponding to one or more resource block groups or an integer value corresponding to a starting position and a length of the allocation, and the target BWP resource allocation type is based on the relationship between resources allocated for the target BWP and resources allocated for the active BWP.

8. The method of claim 7, wherein the relationship corresponds to a difference in a number of information bits in the resource allocation field of the downlink control information in the active BWP compared to a number of information bits in a resource allocation field for the target BWP.

9. The method of claim 7, wherein one of:
the UE is configured for dynamic switching between resource allocation types for the target BWP and the target BWP resource allocation type is preconfigured to a value according to the relationship; and
the UE is configured for dynamic switching between resource allocation types for the target BWP, the target BWP resource allocation type is indicated by a resource allocation type subfield of the resource allocation field in a downlink control information in the target BWP.

10. The method of claim 7, wherein one of:
the target BWP is configured for a greater number of resource blocks than the number configured for the active BWP and the number of information bits available in the resource allocation field of the downlink control information in the active BWP is less than a number of information bits available in a resource allocation field in the target BWP and the bits of the resource allocation field are padded; and
the target BWP is used to allocate a smaller number of resource blocks than allocated for the active BWP and the number of information bits in the resource allocation field of the downlink control information in the active BWP is greater than a number of information bits in a resource allocation field in the target BWP and the remaining bits of the resource allocation field are truncated.

11. A user equipment, UE, supporting dynamic bandwidth part, BWP, switching between an active BWP and a target BWP the UE configured to:
receive an indication of resource blocks, selected by a network node to be used by the UE in the target BWP, in a resource allocation field in a downlink control information in the active BWP, the resource allocation field comprising information bits for allocating one or more resource blocks for the target BWP;
determine the resource allocation type based on a relationship between the resources allocated for the target BWP and the resources allocated for the active BWP, the target BWP resource allocation type indicating whether the information bits of a resource allocation field in a downlink control information comprise a bitmap corresponding to one or more resource block groups or an integer value corresponding to a starting position and a length of the allocation; and
interpret the information bits based on the determined target bandwidth part resource allocation type.

12. The UE of claim 11, wherein the relationship corresponds to a difference in a number of information bits in the resource allocation field of the downlink control information in the active BWP compared to a number of information bits in a resource allocation field for the target BWP.

13. The UE of claim 11, wherein the target BWP resource allocation type is preconfigured to a value according to the relationship.

14. The UE of claim 11, wherein the UE is further configured to interpret the bits of the resource allocation field when the resource allocation field is truncated or padded.

15. The UE of claim 11, wherein:
the target BWP is configured for a greater number of resource blocks than the number configured for the active BWP and the number of information bits available in the resource allocation field of the downlink control information in the active BWP is less than a number of information bits available in a resource allocation field in the target BWP and the bits of the resource allocation field are padded.

16. The UE of claim 11, wherein:
the target BWP is used to allocate a smaller number of resource blocks than allocated for the active BWP and the number of information bits in the resource allocation field of the downlink control information in the active BWP is greater than a number of information bits in a resource allocation field in the target BWP and the remaining bits of the resource allocation field are truncated.

17. A network node for switching between an active bandwidth part, BWP, and a target BWP, for a user equipment, UE, which supports dynamic bandwidth part switching based on a relationship between resources allocated for the target BWP and resources allocated for the active BWP, the network node configured to:
indicate to the UE, the resource blocks selected by the network node, to be used by the UE in the target BWP, in a resource allocation in a field of a downlink control channel information in an active BWP, the allocation field comprising information bits configured according to a target BWP resource allocation type wherein the target BWP resource allocation type indicates whether information bits of a resource allocation field in a downlink control information comprise a bitmap corresponding to one or more resource block groups or an integer value corresponding to a starting position and a length of the allocation and the resource allocation type is determined based on a relationship between resources allocated for the target BWP and resources allocated for the active BWP.

18. The network node of claim 17, wherein the relationship corresponds to a difference in a number of information bits in the resource allocation field of the downlink control information in the active BWP compared to a number of information bits in a resource allocation field for the target BWP.

19. The network node of claim 17, wherein one of:
the UE is configured for dynamic switching between resource allocation types for the target BWP and the target BWP resource allocation type is preconfigured to a value according to the relationship; and
the UE is configured for dynamic switching between resource allocation types for the target BWP, the target BWP resource allocation type is indicated by a resource allocation type subfield of the resource allocation field in a downlink control information in the target BWP.

20. The network node of claim 17, wherein one of:
the target BWP is configured for a greater number of resource blocks than the number configured for the active BWP and the number of information bits available in the resource allocation field of the downlink control information in the active BWP is less than a number of information bits available in a resource allocation field in the target BWP and the bits of the resource allocation field are padded; and the target BWP is used to allocate a smaller number of resource blocks than allocated for the active BWP and the number of information bits in the resource allocation field of the downlink control information in the active BWP is greater than a number of information bits in a resource allocation field in the target BWP and the remaining bits of the resource allocation field are truncated.

* * * * *